United States Patent [19]
Winseck, Jr. et al.

[11] Patent Number: 5,493,609
[45] Date of Patent: *Feb. 20, 1996

[54] TELECOMMUNICATION SYSTEM FOR AUTOMATIC SWITCHING BETWEEN VOICE AND DATA COMMUNICATIONS

[75] Inventors: Michael M. Winseck, Jr.; Richard A. Davis; James Nowack, all of Boulder, Colo.

[73] Assignee: Radish Communications Systems, Inc., Boulder, Colo.

[*] Notice: The term of this patent shall not extend beyond the expiration date of Pat. No. 5,365,577.

[21] Appl. No.: 271,850

[22] Filed: Jul. 7, 1994

Related U.S. Application Data

[63] Continuation-in-part of Ser. No. 877,328, May 1, 1992, Pat. No. 5,365,577, which is a continuation-in-part of Ser. No. 589,203, Sep. 27, 1990, Pat. No. 5,164,982.

[51] Int. Cl.⁶ .................................................. H04M 11/00
[52] U.S. Cl. ........................ 379/96; 348/17; 375/222
[58] Field of Search .......................... 379/90, 91, 93, 379/96–100; 348/14, 15, 17, 18; 375/222, 223

[56] References Cited

U.S. PATENT DOCUMENTS

| | | |
|---|---|---|
| 3,423,534 | 1/1969 | Pan . |
| 4,001,504 | 1/1977 | Hendrickson . |
| 4,168,469 | 9/1979 | Parikh et al. . |
| 4,387,271 | 6/1983 | Artom . |
| 4,621,366 | 11/1986 | Cain et al. . |
| 4,656,654 | 4/1987 | Dumas . |
| 4,661,657 | 4/1987 | Grenzebach et al. . |
| 4,663,766 | 5/1987 | Bremer . |
| 4,715,059 | 12/1987 | Cooper-Hart et al. . |
| 4,727,370 | 2/1988 | Shih . |
| 4,782,498 | 11/1988 | Copeland . |
| 4,815,121 | 3/1989 | Yoshida . |
| 4,905,282 | 2/1990 | McGlynn et al. . |
| 4,932,047 | 6/1990 | Emmons et al. . |
| 4,953,210 | 8/1990 | McGlynn et al. . |
| 5,146,472 | 9/1992 | Hallman . |
| 5,164,982 | 11/1992 | Davis . |
| 5,182,762 | 1/1993 | Shirai et al. . |
| 5,202,899 | 4/1993 | Walsh . |
| 5,241,565 | 8/1993 | Kloc et al. . |
| 5,282,238 | 1/1994 | Berland . |
| 5,365,577 | 11/1994 | Davis et al. .............................. 379/96 |

*Primary Examiner*—Wing F. Chan
*Attorney, Agent, or Firm*—Dorr, Carson, Sloan & Birney

[57] ABSTRACT

A telecommunication system provides voice and data communications over a conventional telephone line that can be dynamically switched from voice mode to any of a plurality of data modes (e.g., fax, modem, or VoiceView protocols) during a single conversation. Each station includes a telephone for voice communications and switching means for selectively connecting the telephone to the telephone line in voice mode and disconnecting the telephone while operating in one of the data modes. A modem provides data communications over the telephone line in any of a plurality of data modes. Voice is the default mode of operation. Prior to switching into a data mode, the originating station first transmits a start signal over the telephone line that includes a mode signal indicating one of the data modes. If a station detects a start signal transmitted by a remote station, a controller directs the switching means and modem to automatically switch from voice mode to the selected data mode in preparation for receiving data from the originating station. The stations also can also query one another to exchange information on their respective capabilities.

26 Claims, 11 Drawing Sheets

Fig. 5

| First Tone Period | | | Second Tone Period | | | Data Mode |
|---|---|---|---|---|---|---|
| 2312.5 Hz | 1412 Hz | 811 Hz | 2912.5 Hz | 2130 Hz | 628 Hz | |
| ○ | ○ | ○ | × | × | × | Not Used |
| – | – | – | × | × | × | Not Used |
| × | × | × | ○ | ○ | ○ | Not Used |
| × | × | × | – | – | – | Not Used |
| ○ | ○ | – | – | ○ | ○ | VoiceView V.21 300 bps |
| ○ | – | ○ | – | ○ | ○ | VoiceView V.27ter 4800 bps |
| ○ | – | – | – | ○ | ○ | VoiceView V.29 9600 bps |
| ○ | ○ | – | ○ | – | ○ | Voice view V.29 4800 bps |
| ○ | – | ○ | ○ | – | ○ | VoiceView V.17 7200 bps |
| ○ | – | – | ○ | – | ○ | VoiceView V.17 9600 bps |
| ○ | ○ | – | ○ | ○ | – | VoiceView V.17 12000 bps |
| ○ | – | ○ | ○ | ○ | – | VoiceView V.17 14400 bps |
| – | ○ | ○ | ○ | ○ | – | Custom |
| – | ○ | ○ | – | ○ | ○ | Modem |
| – | ○ | ○ | – | ○ | – | Facsimile |

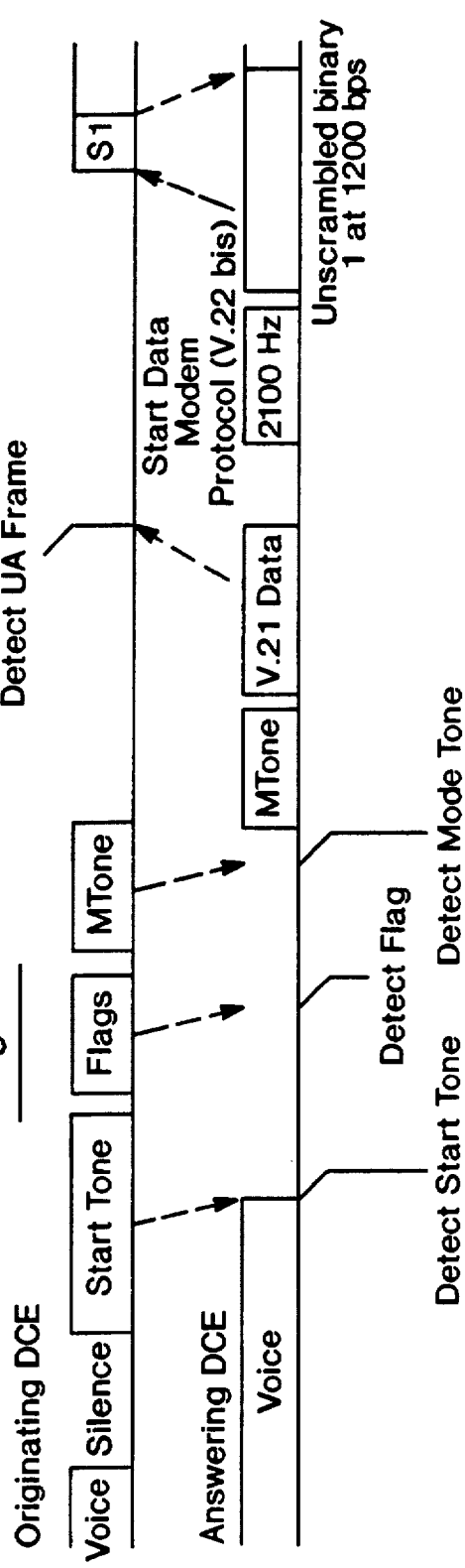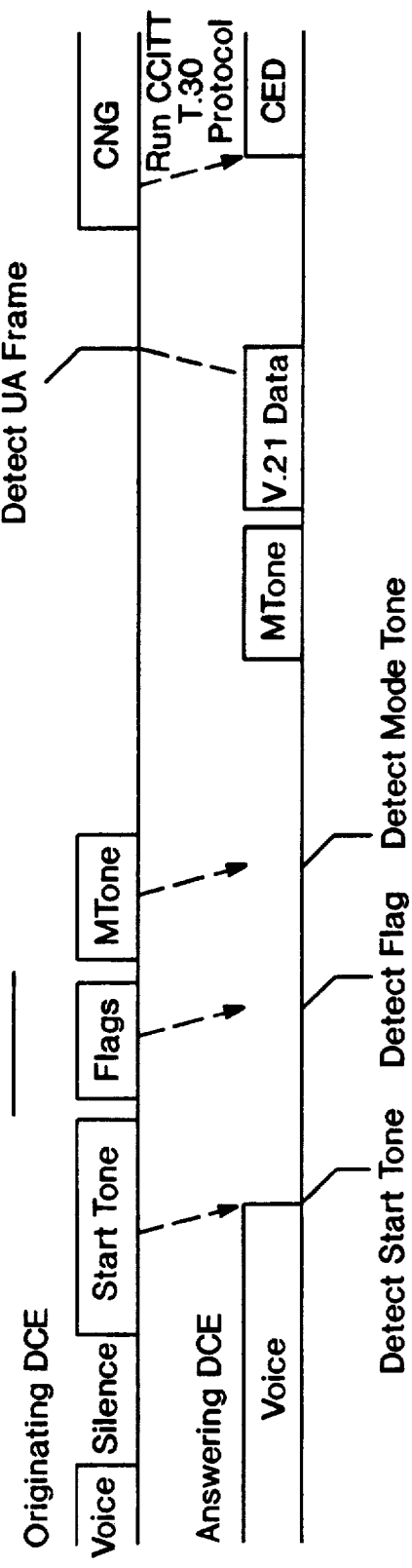

*Fig. 15*

| Octet 1 Bits | 6 | 5 | 4 | 3 | 2 | 1 |
|---|---|---|---|---|---|---|
| *Capability Type* | | | | | | |
| Modem Data Mode | 0 | 0 | 0 | 0 | 0 | 1 |
| Facsimile Data Mode | 0 | 0 | 0 | 0 | 1 | 0 |
| VoiceView Data Mode | 0 | 0 | 0 | 1 | 0 | 0 |
| ADSI Server (data transmitter using Bell 202 modulation) | 0 | 0 | 1 | 0 | 0 | 0 |
| ADSI CPE (data receiver using Bell 202 modulation) | 0 | 0 | 1 | 0 | 0 | 1 |
| Proprietary | 1 | 1 | 1 | 1 | 1 | 1 |

TELECOMMUNICATION SYSTEM FOR AUTOMATIC SWITCHING BETWEEN VOICE AND DATA COMMUNICATIONS

RELATED APPLICATION

The present application is a continuation in part of the applicant's U.S. patent application Ser. No. 07/877,328, filed on May 1, 1992, entitled "Improved Telecommunication Display System," now U.S. Pat. No. 5,365,577, which is a continuation in part of Ser. No. 589,203 filed Sep. 27, 1990, now U.S. Pat. No. 5,164,982, issued on Nov. 17, 1992.

BACKGROUND OF THE INVENTION

1. Field of the Invention

The present invention relates generally to the field of telephony. More specifically, the present invention discloses a telecommunication system that provides automatic switching between a voice mode and a variety of data modes.

2. Statement of the Problem

The present invention is intended to address the problem of communicating both voice and data by telephone over a single conventional telephone line. It is often desirable to be able to transmit data over a single telephone line interspersed with verbal discussions between the parties. This data can be in the form of visual images relevant to the conversation. For example, a travel agent might wish to show a telephone customer a travel itinerary as they discuss it, or a broker might want to show a customer a visual confirmation of a financial transaction that the customer has just made orally over the telephone. Image data can be transmitted over a telephone line, for example, using conventional facsimile machines or the VoiceView™ products marketed by Radish Communications Systems, Inc. of Boulder, Colo. Alternatively, this data can be in the form of one or more data files to be transferred by modem between the parties' computers.

A number of telephone systems have been invented in the past to allow transmission of both voice and data over a single telephone line by switching between a voice mode and a single data mode, including the following:

| Inventor | U.S. Pat. No. | Issue Date |
| --- | --- | --- |
| Davis | 5,164,982 | Nov. 17, 1992 |
| Emmons et al. | 4,932,047 | June 5, 1990 |
| Yoshida | 4,815,121 | Mar. 21, 1989 |
| Cooper-Hart et al. | 4,715,059 | Dec. 22, 1987 |
| Dumas | 4,656,654 | April 7, 1987 |
| Artom | 4,387,271 | June 7, 1983 |

Davis discloses a telecommunications display system for accommodating both voice and data over a single telephone line. The receiving party ("subscriber") is provided with a display terminal 14 that is connected to the telephone line 22, 52 between the telephone network 50 and the base of the user's telephone 12 as shown in FIG. 1 of U.S. Pat. No. 5,164,982. The display terminal includes a voice/data selector that can automatically recognize digital data and switches from voice communication to data communication modes. This patent discusses one embodiment of the VoiceView™ products marketed by Radish Communications Systems, Inc.

Emmons et al. disclose an example of a conversational video phone. The device communicates both audio signals and freeze-frame video images over a standard telephone line.

Yoshida discloses a telephone communication system that recognizes speech and automatically switches from data to speech transmission.

Cooper-Hart et al. disclose a conversational freeze-frame video phone that has been marketed by Luma Telecom, Inc. under the name "Luma." This system includes a camera for periodically capturing an image that is converted into digital data and transmitted over the telephone line to a remote unit in a single short burst. Audio transmission is interrupted upon detection of a video signal being transmitted. The data format and transmission rate for the video signal are fixed.

Dumas discloses a teleconferencing system that supports both audio and graphic communications. Each user has a personal computer (PC) with a smart modem that monitors the telephone line for a predetermined set of identification codes indicating that graphics are about to be sent by another conference participant. Here again, the data format appears to be fixed.

Artom discloses another example of a telephone system for combining voice and data communications over a single telephone line.

In addition to the prior art listed above, a number of modems and other telecommunications systems have been invented in the past that allow selection of multiple data formats or modes of communication that are established at the beginning of the call, including the following:

| Inventor | U.S. Pat. No. | Issue Date |
| --- | --- | --- |
| Pan | 3,423,534 | Jan. 21, 1969 |
| Parikh et al. | 4,168,469 | Sep. 18, 1979 |
| Cain et al. | 4,621,366 | Nov. 4, 1986 |
| Grenzebach et al. | 4,661,657 | Apr. 28, 1987 |
| Levine et al. | 4,876,740 | Oct. 24, 1989 |
| Greszczuk | 4,931,250 | June 5, 1990 |
| Walsh | 5,202,899 | Apr. 13, 1993 |
| Shirai et al. | 5,182,762 | Jan. 26, 1993 |
| Kloc et al. | 5,241,565 | Aug. 31, 1993 |
| Berland | 5,282,238 | Jan. 25, 1994 |

The patent to Parikh et al. shows a data communications adapter to permit communications using the Synchronous Data Link Control format (SDLC).

Greszczuk discloses a multimode modem that sends a sequence of handshake signals corresponding to a variety of modem types, and then configures itself to operate in the mode indicated by the response received from the far-end modem. Walsh discusses another example of a similar system.

The modem disclosed by Shirai et al. negotiates the data transmission rate and data compression technique with the far-end modem during the initial handshaking procedure. The remaining references are only of general interest.

Finally, a number of modems and other telecommunications systems have been invented in the past that allow modems to exchange information concerning various features or data rates that are supported during an initial handshaking protocol, including the following:

| Inventor | U.S. Pat. No. | Issue Date |
| --- | --- | --- |
| Hendrickson | 4,001,504 | Jan. 4, 1977 |
| Bremer | 4,663,766 | May 5, 1987 |
| Shih | 4,727,370 | Feb. 23, 1988 |
| Copeland | 4,782,498 | Nov. 1, 1988 |
| McGlynn et al. | 4,905,282 | Feb. 27, 1990 |
| McGlynn et al. | 4,953,210 | Aug. 28, 1990 |
| Hallman | 5,146,472 | Sept. 8, 1992 |

The two patents to McGlynn et al. show a feature negotiation protocol for modems. The originating modem initiates negotiations by sending a list of supported features. The answering modem responds by confirming that all of the listed features are supported, by returning a subset of the features list, or by sending a different features list.

Copeland discusses a handshake procedure between modems for exchanging data such as device type, modes supported, speeds supported, signal quality conditions, etc.

The Walsh and Greszczuk patents listed previously are also relevant to this category of prior art. The modems described in these patents transmit an initial sequence of handshake signals corresponding to a variety of modem types. The modem then configures according to the response from the far-end modem.

The Bremer patent is an example of a modem with an automatic data rate selection feature. The remaining patents listed above are only of general interest.

3. Solution to the Problem

None of the prior art references show a telecommunication system providing automatic switching between voice and any of a plurality of data modes over a conventional telephone line using the present communications protocol. In particular, the present system allow the units to exchange information concerning their respective communications capabilities and the data modes that each unit supports. The units can then dynamically select different data modes throughout a conversation to transfer data in various formats.

SUMMARY OF THE INVENTION

This invention provides a telecommunication system for voice and data communications over a conventional telephone line that can be dynamically switched from voice mode to any of a plurality of data modes (e.g., fax, modem, or VoiceView protocols) during a single conversation. Each station includes a telephone for voice communications and switching means for selectively connecting the telephone to the telephone line in voice mode and disconnecting the telephone while operating in one of the data modes. A modem provides data communications over the telephone line in any of a plurality of data modes. Voice is the default mode of operation. Prior to switching into a data mode, the originating station first transmits a start signal over the telephone line that includes a mode signal indicating one of the data modes. If a station detects a start signal transmitted by a remote station, a controller directs the switching means and modem to automatically switch from voice mode to the selected data mode in preparation for receiving data from the originating station. The stations also can also query one another to exchange information on their respective capabilities.

A primary object of the present invention is to provide a telecommunication system providing automatic switching between voice and and any of a plurality of data modes over a single telephone line.

Another object of the present invention is to provide a telecommunication system that can dynamically select different data modes throughout a conversation to transfer data in various formats.

Yet another object of the present invention is to provide a telecommunication system that can be readily incorporated into a wide variety of data devices, such as modems, fax machines, and VoiceView products, and enables these devices to exchange information concerning their respective communications capabilities and the data modes that are supported.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 5 is a table of the different data modes for each combination of first and second tones shown in FIG. 4.

FIG. 7 is a diagram of a successful data mode start sequence between an originating DCE and an answering DCE using modem data mode (V.22bis protocol).

FIG. 8 is a diagram of a successful data mode start sequence between an originating DCE and an answering DCE using facsimile data mode (CCITT T.30 protocol).

FIG. 15 is a table of the codings for the "capability type identifier" field in the capability elements shown in FIGS. 14a through 14d.

DETAILED DESCRIPTION OF THE INVENTION

Overview

Figure 1:
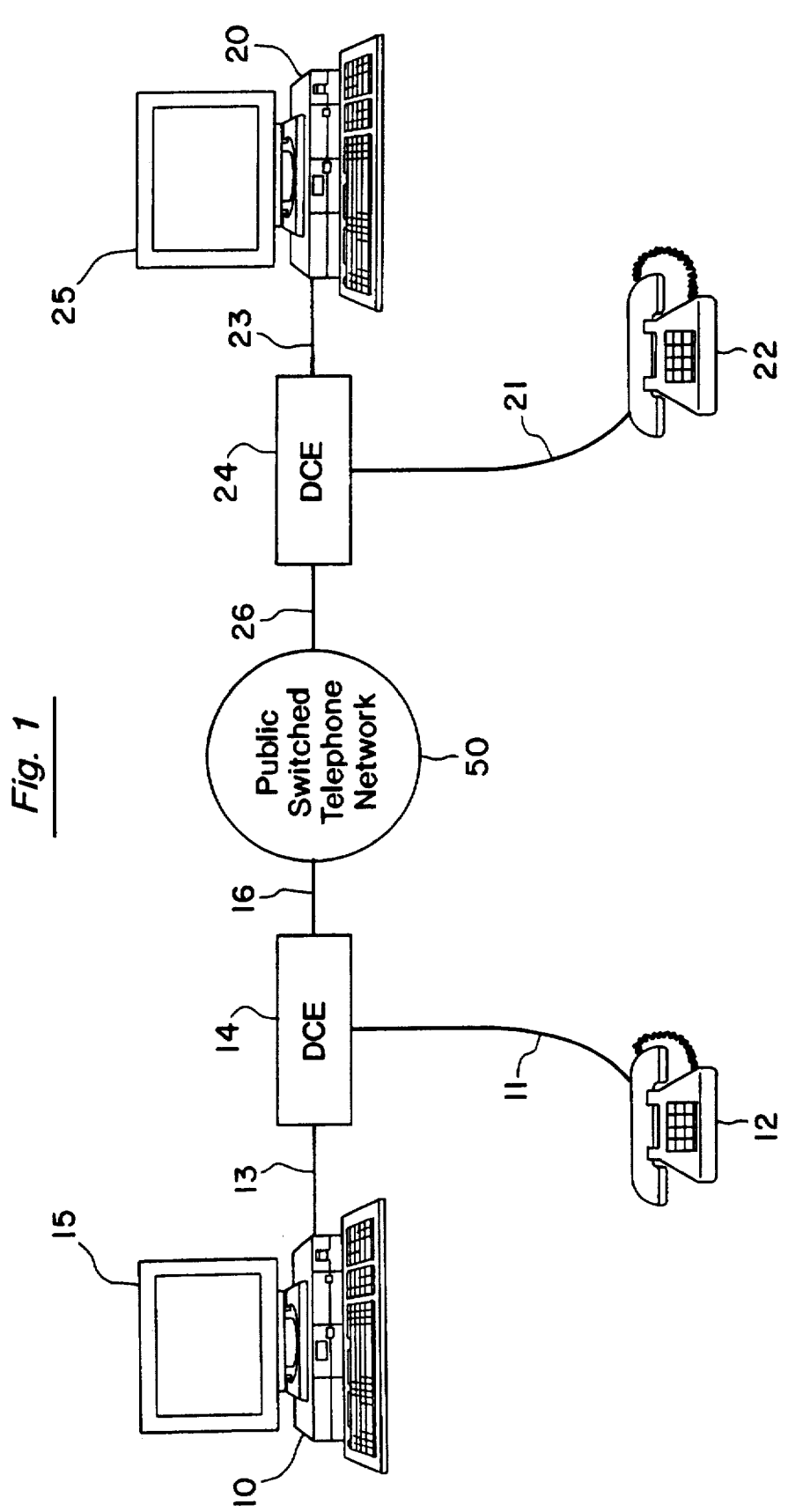
FIG. 1 is a schematic block diagram of the overall invention showing communication between two stations over a telephone network.

Turning to FIG. 1, a schematic block diagram is provided showing two stations communicating over a telephone line 16, 26 via a public switched telephone network 50. Each station includes a conventional telephone set 12, 22 for voice communications. Data circuit-terminating equipment (DCE) 14, 24 is inserted between the telephone 12, 22 and the telephone network 50 to selectively couple the telephones 12, 22 for voice communications, and to selectively provide data communications in any of a variety of data formats, protocols, and/or transmission rates. The DCE 14, 24 is also tied to data terminal equipment (DTE) 10, 20, such as a personal computer for data communications. An RS-232 interface 13, 23 can be employed to connect the DCE 14, 24 to a serial port of the DTE computer system 10, 20. Alternatively, the DCE can be built in and attached via the internal bus of the DTE.

The present system can be employed, for example, by telemarketers, travel agencies, brokerage houses, financial institutions, or any other field of use where there is a need to share visual data during a telephone conversation. Such a telephone call is typically predominated by voice communications using the telephones 12 and 22. However, at desired times during the conversation, either party can momentarily interrupt the telephone conversation and transmit data over the telephone line to the remote station where it can be viewed and stored by the other party. For example, one station may include a database of products for sale, financial records, or airline schedule information that the party at the remote station wishes to see.

The telecommunication linkage is established in voice mode in the conventional manner by one party dialing the telephone number of the other party. The party at the central station accesses the database and generates a display screen 15 or creates a file containing the requested data. This can be accomplished using a DTE 10, such as a personal computer having a computer processor, a display screen 25, and a keyboard. At an appropriate time during the conversation, the party at the central station activates a data transmission command (e.g., by pressing a predetermined key combination on the computer keyboard, or by clicking a mouse on a predetermined icon on the computer display screen 15). The DTE processor 10 directs the DCE 14 to disconnect its telephone 12 and to transmit a start signal over the telephone line requesting that the remote DCE 24 switch to data mode. This start signal also indicates the format and transmission rate (the "mode") in which the data will be transmitted. Upon receipt of the start signal, the remote DCE 24 automatically disconnects its telephone 22 to temporarily suspend voice communications and configures itself to receive data in the specified mode. The data is then downloaded by the central station DTE 10 to its DCE 14, which modulates and transmits the data over the telephone line to the remote DCE 24. The remote DTE 20 uploads the received data from its DCE 24 and displays the data on its screen 25 for the remote user. Both stations automatically return to voice mode after the data has been transferred. Data can also be transmitted in the opposite direction by the remote user using the same procedure for bidirectional communications.

Figure 2:
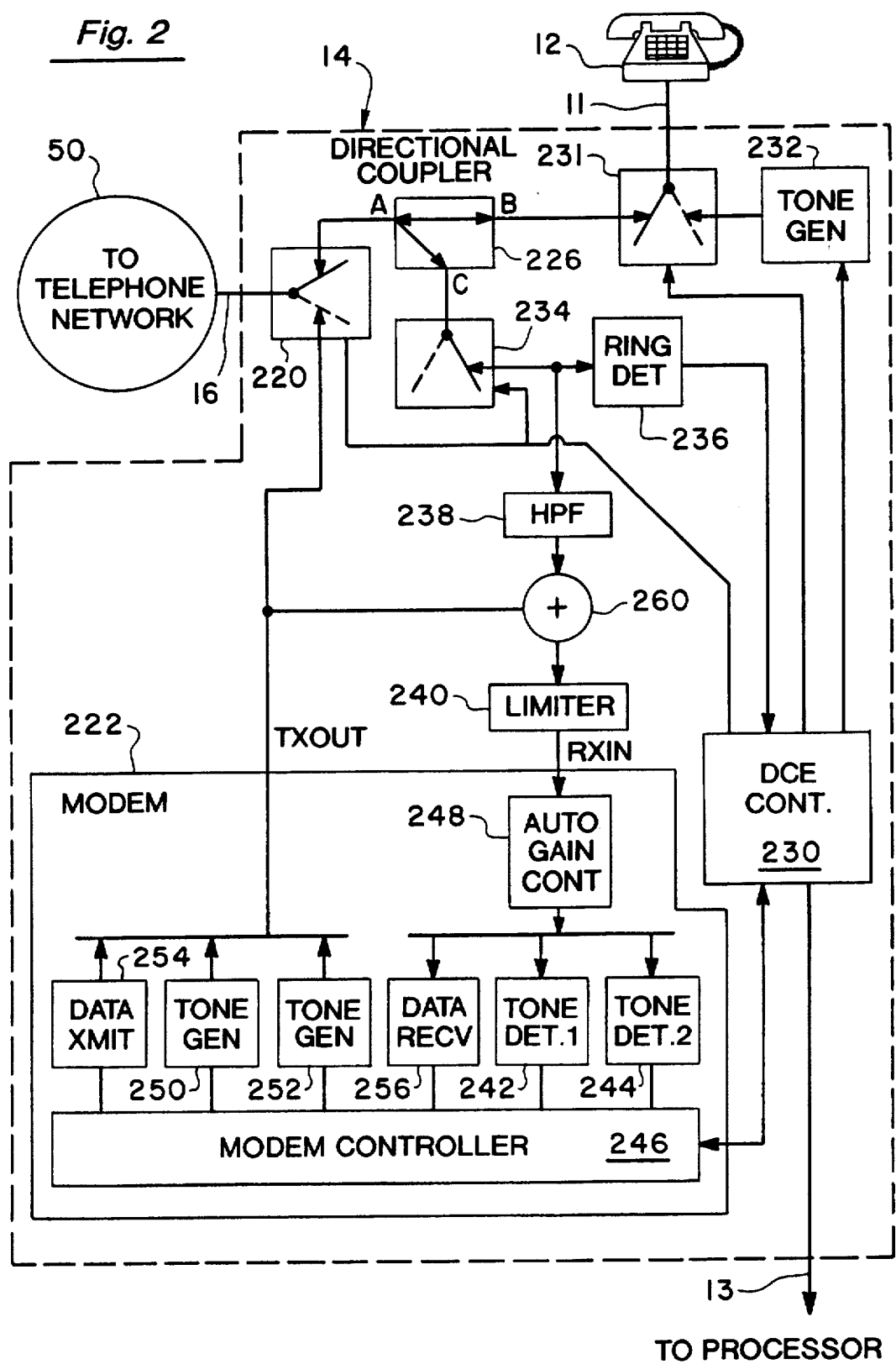
FIG. 2 is a schematic block diagram of the data circuit-terminating equipment (DCE) 14.

FIG. 2 shows the physical layer of the DCE 14, including a telephone line 16 from the telephone network 50 connected to a first relay switch 220. This first relay switch 220 is for connecting and disconnecting the telephone 12 and modem 222 to and from the telephone line in response to control signals from the DCE controller 230. The DCE controller is preferably a microprocessor with associated memory and peripheral circuitry. When the first relay switch 220 is switched to its alternative broken-line position, incoming signals are rerouted via a summing device 260 to the receive-in (RXIN) port of the modem 222.

The telephone 12 is also connected by a line 11, a second relay switch 231, and a directional coupler 226 to the first relay switch 220. The second relay switch 231 also operates in response to a control signal from the DCE controller 230 to connect and disconnect a tone generator to the telephone 12 to provide a pleasing tone or a voice message while the telephone is disconnected during data mode. A third relay switch 234 is provided to connect and disconnect a ring detector 236 and the DCE controller 230 from the incoming telephone signal via the directional coupler 226.

The system is normally defaulted to voice mode, in which all of the relay switches 220, 231, and 234 are in the solid-line positions shown in FIG. 2 and as described above. The user can call out in the conventional manner by dialing the desired number and ringing out. The directional coupler 226 operates such that signals are transmitted bidirectionally between its contacts A and B (i.e., between the telephone 12 and the telephone network 50). On the other hand, the directional coupler 226 allows only incoming signals at contact A to be transmitted to contact C. At contact C, the ring detector 236, high pass filter 238, and the receive port (RXIN) of the modem 222 are connected to the directional coupler 226. Signals from the telephone 12 on contact B cannot reach contact C in the directional coupler 226, so that signals from the telephone 12 do not reach the modem's tone detectors 242 and 244. The directionality of the directional coupler 226 is not perfect, but it greatly enhances the reliability of start tone detection. The receive path also includes a high pass filter 238 to limit low-frequency noise, and a limiter 240 and an automatic gain control amplifier 248 to maintain the amplitude of the incoming signal within predetermined maximum and minimum limits. The analog telephone signal received by the modem 222 is demodulated by the data receive block 256 to deliver corresponding digital data to the modem's controller 246.

In the preferred embodiment, the data receive block 256 can be configured by the DCE controller 230 and modem controller 246 to selectively operate at any of a number of different data modes (e.g., VoiceView, facsimile, modem file transfer, etc.) and data transmission rates (e.g., V.21 300 bps FSK, V.27ter 4800 bps DPSK, or V.29 9600 bps QAM). The analog signal received by the modem 222 is also monitored by a number of tone detectors 242 and 244 to detect predetermined tones used to signal the start of data transmission and to indicate the data transmission rate and data format. In the preferred embodiment of the present invention, the modem 222 includes two tone detectors adapted to detect a start tone defined by frequencies of 2312.5 Hz and 2912.5 Hz for approximately 200 msec. This start tone is followed by a series of HDLC flags transmitted using the V.21 300 bps (high channel) FSK modulation scheme, which in turn is followed by a mode signal to specify the mode for the data being transferred (e.g., VoiceView, facsimile, modem data transfer, etc.) and the data transmission rate (i.e., 9600, 4800, or 300 bps). In one embodiment, the mode signal is a tone having one or more combinations of frequencies (e.g., 2312.5 Hz, 1412.5 Hz, or 811 Hz). However, in one alternative embodiment, the mode signal is transmitted as data in a V.21 HDLC frame. It should be expressly understood that the DCE 14 shown in FIG. 2 is merely one example of many possible implementations of this device.

In operation, the DCE 14 automatically switches between a voice mode and a data mode under control of its DTE 10. In voice mode, the DCE controller 230 controls the relay switches 220, 234, and 231 to their released positions shown in FIG. 2. This directly couples the telephone 12 to the telephone line 16, thereby providing normal voice communications between the telephones through the telephone network 50. Additionally, the modem 222 transmit port (TXOUT) is disconnected from the telephone line 16 by a first relay switch 220 to prevent any extraneous signals produced by the modem 222 from interfering with voice communications. However, the receive port of the modem 222 remains coupled to the telephone line. This enables the tone detectors 242 and 244 within the modem 222 to continually listen in on the voice communications and detect the presence of start signals indicating that the remote station intends to transmit data.

Data mode can be initiated in either of two situations. The first case occurs when the DTE wishes to transmit data to the remote station. The second case occurs when the modem tone detectors 242 and 244 detect a start signal indicating that the remote station intends to initiate a data mode. In either case, the DCE controller 230 activates the relay switches 220 and 231 to disconnect the telephone 12 from the telephone line 16, and instead couples the modem transmit port (TXOUT) to the telephone line 16.

Prior to initiating a data mode request to a remote station at the other end of a telephone connection, the transmitting DCE begins in the default voice mode with the switches 220, 231, and 234 released to the positions depicted in FIG. 2. The DTE processor 10 determines whether the user has indicated a desire to transmit data (i.e., initiate data mode) by pressing a predetermined key or clicking on a predetermined area of the display screen using a mouse, as provided by the application layer. If so, the DTE directs the DCE controller 230 to change the positions of the relay switches 220, 231 and 234 to data mode. In addition, the DCE controller 230 directs the modem 222 to establish a data link with the remote station. In particular, the modem controller 246 controls a number of tone generators 250 and 252 to generate start tones to signal the start of data transmission and to indicate the data mode prior to transmitting data to the remote station. After the data link has been successfully established, each data block is forwarded by the DTE processor 10 through the DCE controller 230 and modem controller 246 to the data transmit block 254, which modulates and transmits a corresponding analog signal to the remote station's DCE 24 over the telephone connection 16, 50, and 26 as indicated in FIG. 1. The remote station can then transmit data which is received and demodulated by the data receive block 256 of the modem 222. This data is passed by the DCE controller 230 for use by the DTE 10. After the data session has ended, the sending DCE can return to voice mode by tearing down the data link and releasing the relay switches 220, 231, and 234 to their default positions shown in FIG. 2.

To receive data from a far-end station, the receiving station begins again in the default voice mode with the switches 220, 231, and 234 released to the positions depicted in FIG. 2. If the modem 222 detects the start tones followed by the remainder of the start sequence indicating that the remote station intends to transmit data, the DCE 14 notifies its DTE 10. The DCE can accept or reject the data mode request based on its current capabilities. Normally, the DCE 14 accepts the data mode request and proceeds to convert to the specified data mode. In particular, the DCE 14 establishes a data link with the remote station, and changes the switches to their data mode positions, as previously discussed. After the data link has been established, the remote station can transmit its data, which is received and demodulated by the data receive block 256 of the modem 222. This data is passed by the DCE controller 230 for use by the DTE 10. After the data link has been successfully established, each data block is forwarded by the DTE processor 10 through the DCE controller 230 and modem controller 246 to the data transmit block 254, which modulates and transmits a corresponding analog signal to the remote station's DCE 24 over the telephone connection 16, 50, and 26 as indicated in FIG. 1. After the data session has ended, the DTE 10 can return the DCE 14 to voice mode by tearing down the data link, and releasing the switches to their default positions shown in FIG. 2.

Data Mode Start Sequence

Figure 3:
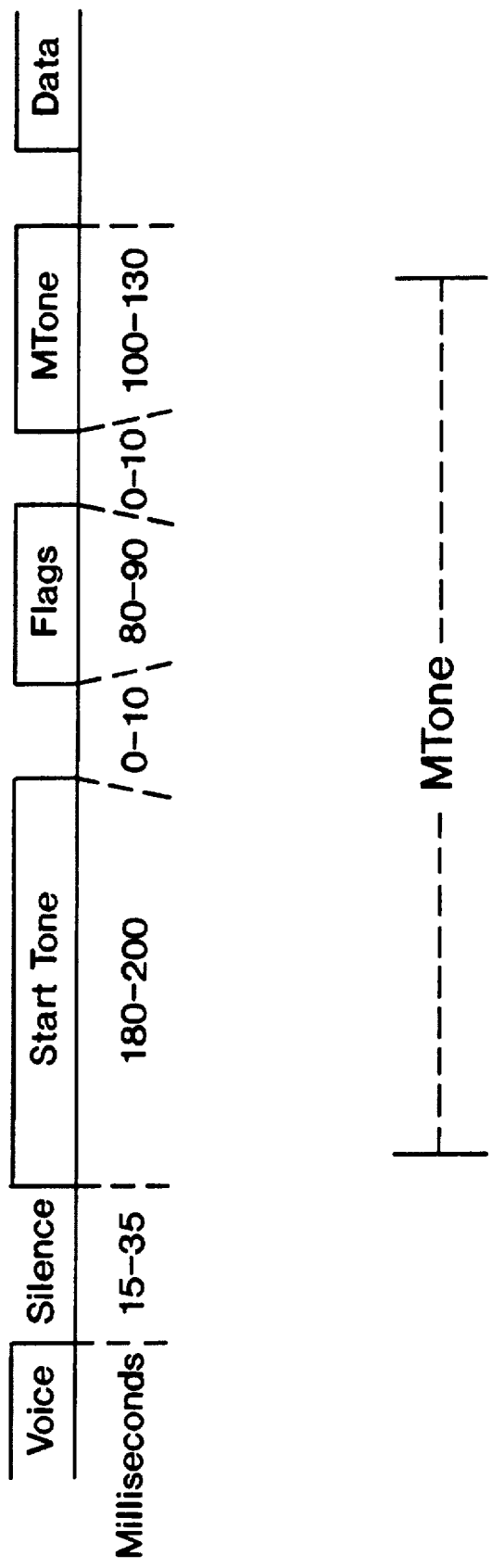
FIG. 3 is a diagram of the signals transmitted by a DCE constituting the data mode start sequence.

The data mode start sequence is a collection of tones and modulated carrier that requests the answering DCE to switch from voice mode to data mode and establish a data link, and indicates which data modulation type will be used for the information transfer. FIG. 3 shows the signals that constitute the data mode start sequence. The originating DCE transmits this signal sequence to the answering DCE. The physical layer of the answering DCE switches to data mode when a start tone is detected. The remaining elements of the data mode start sequence are used to further identify that the signal being detected is a valid start sequence and to identify in which data mode to operate (VoiceView, modem, facsimile, etc.). The flag sequence and mode signal perform these two functions, respectively.

The originating DCE begins the sequence by transmitting approximately 25 milliseconds of silence. During this period, the originating DCE switches its local telephone out of the communication path, mutes the voice path to the local telephone, allows the telephone network interface to settle, and configures itself to transmit the data mode start sequence. A start tone having frequencies of 2312.5 Hz and 2912.5 Hz is used to begin the data mode start sequence. These frequencies have been selected because they are in a frequency band where the human voice has relatively low energy and they do not interfere with the commonly used telephony and data communications tones.

"Talk-off" is a phenomenon that can affect the successful detection of the start sequence. Talk-off occurs when the human voice or some other audible sound emulates the start tone and causes the DCE to react as if it had received a valid signal. Avoiding the commonly used tones and frequencies listed above is crucial to achieving acceptable talk-off performance of a DCE. In addition, the HDLC flag sequence following the start tone makes it significantly more difficult to unintentionally simulate the start sequence.

The proper detection of the start sequence can also be impaired by a second phenomenon known as "talk-down." Audible signals (e.g., speech, background noise, coughing, etc.) from the telephone may be present simultaneously with the reception of a start tone from a remote DCE. The DCE must be able to detect the start tone concurrently with these signals from the local telephone. The directional coupler, discussed above, provides one possible technique for minimizing talk-down.

The start sequence includes a minimum of three complete HDLC flags (01111110) transmitted following the start tone. The flag sequence enables the DCE to better detect the data mode start sequence and avoid talk-off. The transmission of the first bit of the first flag begins at least 10 milliseconds following the end of the start tone. The flags are transmitted using the V.21 300 bps (high channel) FSK modulation scheme. Once the answering DCE detects a single HDLC flag it remains in data mode and monitors for the mode signal to prepare itself for the forthcoming data modulation scheme. If no mode signal is detected after detecting the HDLC flag, data mode terminates and voice mode is re-established.

Figure 4:
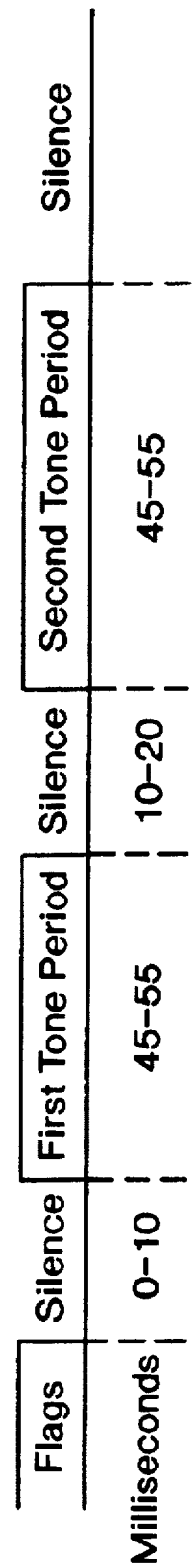
FIG. 4 is a diagram of the mode tone (MTone) portion of the data mode start sequence.

A mode tone (or MTone) is one method used to identify the data mode in which the DCEs will operate. Transmission of the mode tone begins within 10 milliseconds following the last bit of the flag sequence. The mode tone is actually comprised of two periods of tone separated by a short period of silence as shown in FIG. 4. During each tone period, either a single frequency tone or dual frequency tone is present. The first tone period contains a tone comprised of the following three frequencies: 811 Hz, 1412 Hz, and 2312.5 Hz; while the second tone period contains a tone comprised of these three frequencies: 2912.5 Hz, 2130 Hz, and 628 Hz. FIG. 5 shows the different combinations of these frequencies for both tone periods and the corresponding data mode for each tone combination.

The (000) combination in a tone period is not used because it indicates no tones present, which results in an unreliable way to communicate between the DCEs. The (111) combination for each tone period is not used in order to eliminate the need to generate three tones simultaneously. The (100001) tone combination defines an escape sequence used to specify custom data modes. This tone will be followed by a custom data mode identifier that contains further information specifying in which information transfer mode the DCEs will run. The custom data mode identifier is an HDLC frame transmitted using V.21 300 bps modulation. The (001100), (010100), and (011100) tone combinations indicate the default VoiceView data mode transmission rates. These tones correspond to the CCITT V.21 300 bps, CCITT V.27ter 4800 bps, and CCITT V.29 9600 bps modulation schemes, respectively. The highest transmission rate is referred to as the Priority rate and is normally used to transmit data between DCEs. The medium speed rate is called the Recovery rate and is used to retransmit data that cannot be successfully transmitted at the Priority rate. The slowest rate is called the Burst rate and is used to send small packets of data, including acknowledgments, between DCEs.

Modulation schemes other than the above-specified defaults may be used in VoiceView data mode for the Priority and Recovery rates. Burst rate should always use V.21 300 bps because of its robustness and lack of a training sequence. As defined in FIG. 5, optional data modulation schemes that may be used during VoiceView data mode include: V.29 4800 bps and V.17 7200 bps, 9600 bps, 12000 bps, and 14400 bps. To ensure that the DCEs on both ends of the call support an optional rate, a two-way exchange of capabilities should be performed using the capabilities query. The transmitting DCE can then send data by using the mode tone corresponding to any common data rate.

The (100100) tone combination indicates the modem data mode of operation. The DCE, when operating in this mode, adheres to established data communications standards for conventional modems. The default mode of operation assumes CCITT V.22bis. However, the data protocol used may be set by the DTE. The (100101) tone combination indicates the facsimile mode of operation. The DCE, when operating in this mode, adheres to the CCITT T.30 standard for facsimile operation.

Figure 6:
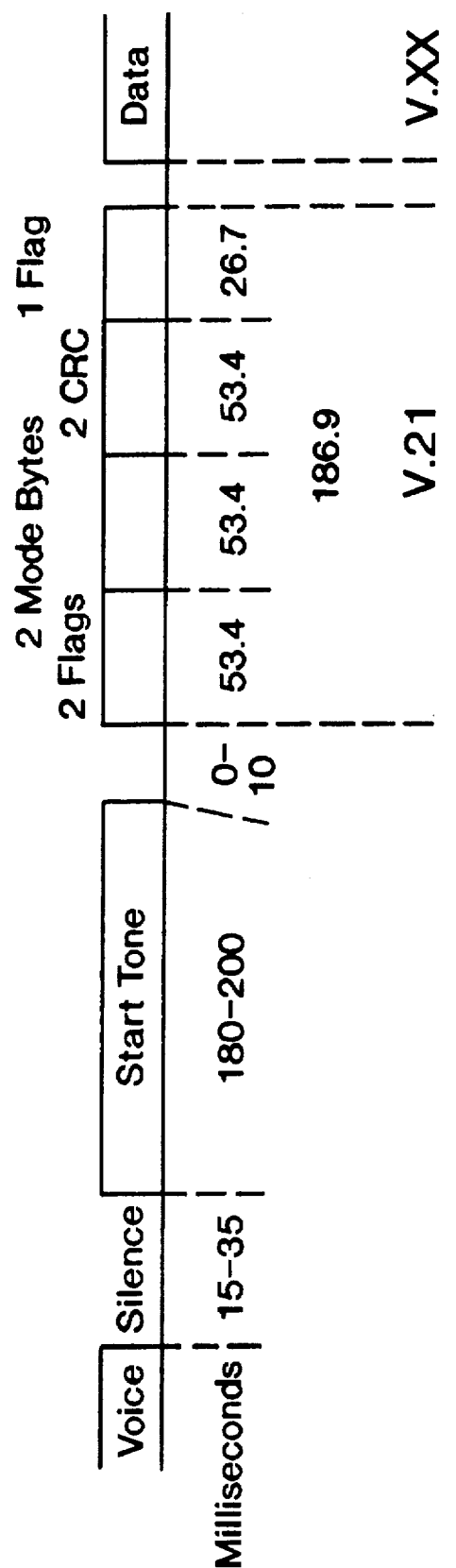
FIG. 6 is a diagram of an alternative embodiment of the data mode start sequence in which the mode tone sequence is replaced with data encoded in a V.21 HDLC frame to identify the data mode.

FIG. 6 shows an alternative embodiment of the start sequence in which the mode tones have been replaced with a V.21 HDLC frame. The two mode bytes identify the mode of the data to be transferred. The first mode byte has the form of 000001XX through 111111XX (i.e., it cannot be 000000XX). This allows support of 64,512 modes. However, the two mode bytes should be coded to avoid sequences of five or more consecutive ones to avoid bit stuffing. Subsequent data blocks transmitted with V.21 modulation begin with three HDLC flags, an address byte, a control byte, and a number of data bytes and conclude with two CRC bytes and one or more HDLC flags. The address and control bytes have a double meaning in that they identify the transfer is at V.21 and the HDLC frame type. Alternatively, subsequent data blocks transmitted with non-V.21 modulation are preceded by a V.21 header containing three HDLC flags followed by two mode bytes, two CRC bytes, and a number of HDLC flags. This alternative protocol offers minor savings in the start-up time for single data block transmissions, and more substantial savings in the transmission time for multiple block transfers. It also allows new data modes to be identified without incurring additional overhead, unlike the mode tone/custom data mode approach previously described.

Once the hardware of the answering DCE detects a valid mode signal as part of the complete data mode start sequence, it configures itself to support the data modulation scheme indicated by the mode tone and reports the data mode request to the DTE if it is currently configured with those capabilities. If it does not support the data mode, it rejects the request and returns to voice mode. If a request for VoiceView data mode is accepted, the originating DCE should begin sending the data carrier as soon as possible (but not within 5 milliseconds) following the end of transmitting the mode signal. In other data modes, the DCE does not initiate data carrier until so instructed by a command from the DTE. The answering DCE readies itself to receive or transmit data as soon as possible following the end of the mode tone. In each data mode, data transfer does not actually begin until the data modulation training sequence (if required) and/or handshaking (if required) are completed.

DATA TRANSMISSION MODES

VoiceView Data Mode

VoiceView data mode represents the fundamental functionality of the DCE. During VoiceView data mode, information may be transmitted in both directions between DCEs in a half-duplex manner. One of the DCEs must maintain the master role in controlling the data link throughout the transaction. The originating DCE starts the transaction as the master because it must send the first data message. The originating station can control whether the link will operate in either a one-way or two-way alternating scenario for this transaction. The link control uses terminating characters at the end of each data message to pass control of the link from one station to the other.

In a one-way scenario, the originating side sends the data message and indicates that it will not accept a response during this transaction. When the message is acknowledged the two DCEs return to voice mode. If the answering DCE needs to transmit data, it waits until the originating DCE has completed its data transmission and the two DCEs have returned to voice mode. Then the answering DCE can initiate the data mode start sequence and become the originating DCE in order to transmit the data that it has available.

For the two-way alternating scenario, the originating DCE will indicate to the answering DCE at the end of its data message that it will accept a data message response. If the answering DCE needs to transmit data, it can then transmit its data message. At this point the answering DCE can control the link using the indicator at the end of its data message. The answering station can decide either to accept or not accept a data message response. If the answering DCE will accept a data response, control of the link will again revert to the originating DCE. Either DCE can request a disconnect of the data link at any point in the transaction at which it is capable of transmitting an HDLC frame.

As discussed in the previous section, three transmission rates are used to convey data during VoiceView data mode: priority rate, recovery rate, and burst rate. Three default modulation schemes corresponding to these rates are: V.21 300 bps FSK, V.27ter 4800 bps DPSK, and V.29 9600 bps QAM.

The VoiceView data link layer protocol is based on HDLC, as discussed below, and transmits information synchronously in data frames. Each frame begins and ends with one or more unique octets, termed "flags." The recipient of data frames provides acknowledgment to the sender via an HDLC acknowledgment frame. The number of data frames that can be transmitted before an acknowledgment is required is known as a window. In VoiceView data mode, up to a window's worth of frames can be transmitted sequentially in a "data block." Since VoiceView data mode is a half-duplex protocol, one data block at a time is transmitted by the DCE and must be acknowledged by the far-end DCE before the next data block is sent.

The originating DCE initiates the modulation carrier, starts the training sequence (if any), and transmits the starting data block as a result of receiving an initiate data session indication and at least the first frame of data to be transmitted from its DTE. After transmitting each data block, the DCE terminates transmission of the data carrier and immediately configures itself to receive data. If the originating DCE receives any response from the answering DCE after transmitting a starting data block, it uses a "subsequent block" format for all subsequent transmissions during the current data transaction until returning to voice mode. The subsequent block format consists of a mode signal (e.g., MTone), followed by a data block modulated at either the burst, recovery, or priority data transmission rate as indicated by the mode signal. However, if the transmission rate is V.21 300 bps and the HDLC mode indicator is used, only the data frame is sent because the mode signal is included within the frame.

The mode tone is used to indicate the modulation scheme for subsequent data blocks as it did for the starting data block format. The data modulation training sequence used for subsequent data blocks is the same as that used for the starting data block with one exception. When V.17 modulation is used, the short train (142 msec.) is employed for subsequent data blocks transmitted after the first data frame has been successfully acknowledged.

The subsequent data block format is also used by the answering DCE when transmitting any HDLC frames while in VoiceView data mode. All data blocks containing a single HDLC Supervisory or Unnumbered frame must be sent efficiently and reliably since these frames cannot be retransmitted if an error occurs. Therefore these data frames are transmitted using the subsequent data block format at the burst transmission rate (V.21 300 bps FSK). This format is referred to as the "response data block" format and is used to exchange data in certain circumstances outside of VoiceView data mode, as follows:

(a) to acknowledge or reject the data mode start sequence for all data modes;

(b) to send the DISC frame when rejecting a request to switch to an unsupported data mode;

(c) to send the UA (Unnumbered Acknowledgment) to accept the switch to the requested data mode;

(d) to send capabilities response information in Unacknowledged Information (UI) frames when responding to the capabilities query.

Whenever any data frames are transmitted using the response data block format, the data block begins with three HDLC flags in order to satisfy V. 21 data synchronization requirements.

Modem Data Mode

Modem data mode is employed to enable the DCE to support any of a variety of standard modem data modulation protocols. FIG. 7 shows the signaling required for a DCE to switch from voice mode to modem data mode. The communications standards and the negotiation procedures used during the data mode can be selected by the DTE using manufacturer-specific procedures. For example, commands, such as ATB and ATN, as well as registers, such as S37, may be used for this purpose. The DCE should support data modem interworking in accordance with TINEIA-PN2330. This standard provides backwards compatible procedures that enable the DCE to proceed with the data handshaking procedure without having to know which protocols are supported on the far-end. However, the DTE may use the capabilities query to determine which data protocols, such as V.32, V.32bis Annex A, V.32 terbo, or V.34 are supported by the far-end DCE.

The originating DCE transmits the data mode start sequence, including the mode signal specifying modem data mode. Once the mode signal has been transmitted, the originating DCE starts a timer and monitors the telephone network interface for V.21 300 bps modulated data or a mode tone followed by V.21 data. If V.21 data is received, it is processed to determine whether it contains a DISC (disconnect) frame or a UA (unnumbered acknowledge). If the DISC is received, the originating DCE aborts the attempt to establish data mode and returns to voice mode. If the UA is received, the originating DCE configures itself to run the appropriate data handshaking protocol when so instructed by the DTE. If no DISC or UA is received and the timer expires, the DCE terminates data mode, notifies the DTE with an ERROR result code, and returns to voice mode. FIG. 7 shows a successful modem data mode start sequence including the initial phase of data handshaking for V.22bis.

When an answering DCE detects a valid start tone and flag sequence, it then monitors for the mode signal. If the modem data mode tone is detected, it is reported to the DTE via a −SMD message, as described below. If the DCE is configured to accept the modem data mode request, it transmits a UA frame to the originating DCE. Otherwise, the DCE returns a DISC in response to the data mode start sequence. Upon termination of the modem data mode, the DCE returns to voice mode.

Facsimile Data Mode

FIG. 8 shows the signaling required for a DCE to switch from voice mode to facsimile data mode. The facsimile negotiation procedures adhere to CCITT T.30. The originating DCE transmits the start sequence including the mode signal specifying facsimile data mode. Once the mode signal has been transmitted, the originating DCE starts a timer and monitors the telephone network interface for a mode tone followed by V.21 300 bps modulated data (or V.21 data if the HDLC mode indicator is used). If V.21 data is received, it is processed to determine whether the frame was a DISC or UA. If the UA response is received, the originating DCE switches to fax mode and sends the CNG signal when instructed by the DTE. It will then monitor the telephone network interface for the fax answer tone (CED). If the answer tone (CED) is received, the originating DCE configures itself to start the T.30 facsimile protocol. If on the other hand, the DISC is received, the originating DCE aborts the attempt to establish fax data mode and returns to voice mode. If the timer expires, the DCE terminates data mode, notifies the DTE, and returns to voice mode. FIG. 8 shows a successful start sequence between two DCE devices implementing facsimile data mode.

Custom Data Mode

The custom data mode sequence provides for a custom data mode identifier to immediately follow the custom data mode tone. The identifier consists of a flag-bounded HDLC UI frame transmitted using V.21 300 bps (high band) modulation. The physical layer of an answering DCE, upon detecting the custom mode tone, prepares to receive data transmitted using the V.21 300 bps modulation scheme. It passes the received data to the DCE controller and DTE for processing in accordance with the specified customer data mode. If the DCE receives an unsupported custom data mode sequence, it may reject it by transmitting the HDLC DISC frame as described below. Using the HDLC mode indicator format, all new "custom" data modes are indicated by new codings of the mode octets.

Capabilities Query

The capabilities query is used to query the far-end of a call to determine whether it is equipped with a switched voice/data DCE device and to determine its current capabilities. The capabilities query can also be initiated by a DCE to identify itself to the far-end device using the two-way capabilities exchange. The query is designed so that if the far-end is not equipped with a compatible voice/data DCE, the phone user receiving the query will be minimally inconvenienced by hearing a short burst of tone. However, if the far-end is equipped with a compatible device, it will switch to data mode, quickly respond to the query, and then return to normal voice mode. Typically the entire query/response sequence will be completed in less than one second.

Figure 9:
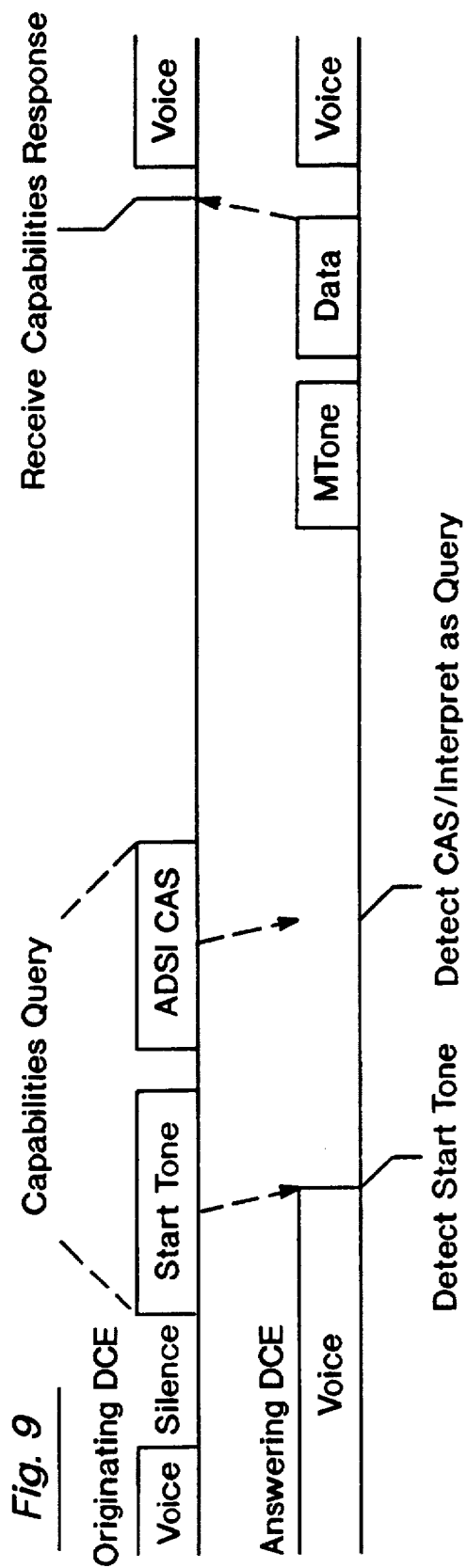
FIG. 9 is a diagram of a capabilities query and response sequence for a DCE.

The query consists of a silence period, followed by the VoiceView start tone, followed by the ADSI CPE Alerting Signal (CAS) having nominal frequencies of 2130 Hz and 2750 Hz for a duration of 80 to 85 msec. as defined in Bellcore TR-NWT-000030. A DCE detecting a start tone switches into data mode. If a valid CAS tone is confirmed within 290 msec. of the beginning of the start tone, it is interpreted as a capabilities query. If neither a CAS tone nor an HDLC flag (indicating a start data mode sequence) is received within 290 msec. of the beginning of a valid start tone, then the physical layer of the answering DCE returns to voice mode and informs its DTE of a talk-off occurrence. The query is implemented so that the far-end equipment will respond to it differently if the device is an ADSI-only CPE or a VoiceView DCE supporting enhanced capabilities. Therefore, the DCE originating a query must be able to detect the different possible responses to the query. An ADSI CPE will respond with a DTMF A tone (lower tone: 697 Hz; upper tone: 1633 Hz). In contrast, a VoiceView DCE which receives a capabilities query responds with a capabilities response message rather than the DTMF A tone. The capabilities response consists of a mode tone followed by data in a flag-bounded HDLC UI frame transmitted at the rate identified by the mode signal. It is typically transmitted using V.21 300 bps modulation. In this case, if the HDLC mode indicator format is used, only the UI frame is sent because the mode indicator is included within the frame. If the transmission time of the frame will exceed one second, the recovery transmission rate is used instead. The format of this message is described above for VoiceView data mode. This query/response scenario is shown in FIG. 9.

Figure 10:
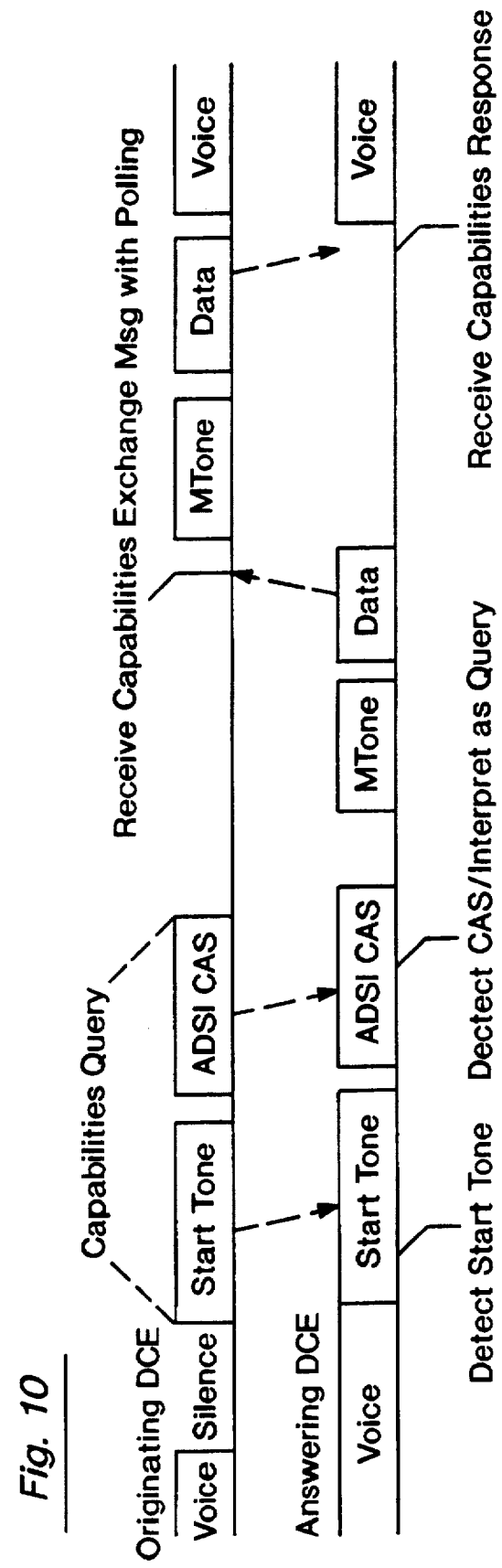
FIG. 10 is a diagram of a capabilities exchange sequence for a DCE.

The answering DCE switches to data mode upon detecting the start tone and returns to voice mode after the capabilities query/response scenario is complete. However, the answering DCE's physical layer returns to voice mode only after being directed to do so by the DTE because a two-way capabilities exchange may occur, rather than the simple query/response scenario shown above. The answering DCE can be optioned to perform a two-way capabilities exchange, rather than simply responding to a query with its own capabilities information. When so optioned, a capabilities message with polling is returned in response to the query instead of the normal capabilities response message. The answering DCE remains in data mode until either a response is received from the originating DCE or a timer expires. This bidirectional exchange of capabilities information is shown in FIG. 10. Once a DCE determines the far-end capabilities, it can switch between different data modes during the course of a call by using the start tone followed by a different mode signal.

Data Link Layer Protocol

The present invention can be viewed in terms of the lowest three layers of the OSI (Open Systems Interconnect) model protocol stack as described in ISO 7498-1. These layers are: layer 1 - physical layer; layer 2 - data link layer; and layer 3 - network layer. The physical layer involves the electrical connection to the telephone network, including the DCE hardware used to support switching between voice and data modes, data transmission modes, etc. The data link layer (layer 2) protocol uses a subset of HDLC command and response frame types to enable the DCE to communicate with the far-end DCE(s). The data link layer protocol provides the following functions: switching between voice and data modes, unacknowledged information transfer of capabilities information, and provision of an error-controlled data link protocol for data mode. In particular, the data link layer protocol can initiate the DCE hardware's switch between voice and any supported (modem, facsimile, or VoiceView) data mode. It manages the establishment of data mode either when requested by command from the DTE, when events are received from the far-end DCE, or as a result of events reported by DCE hardware. In addition, the data link layer entity provides the following services for data transmission within data mode:

(a) Indicates to the physical layer the half-duplex link direction (sending or receiving) and data modulation rate in which it should be operating.

(b) Segments data (messages) received from the DTE interface into link layer frames for transmission over the telephone network interface.

(c) Assembles data in Information (I) frames or Unnumbered Information (UI) frames received from the far-end DCE into a contiguous data stream comprising an entire message that is passed to the DTE.

(d) Detects errors in received messages using sequence numbers and a Frame Check Sequence (FCS). Error correction is performed via retransmission of frames.

The data link layer protocol also provides the following services in support of the capabilities query function:

(a) It assembles capability information received from the DTE into a UI frame for transmission to the far-end DCE.

(b) It indicates to the far-end DCE when a capabilities information exchange (rather than just a notification) is desired.

(c) It extracts capability information present in UI frames received from the far-end DCE and conveys the information to the DTE.

For example, the data link layer protocol can be implemented using the following command and response frame types:

| | |
|---|---|
| I | Information transfer, used to transfer sequentially numbered frames containing information provided by the DTE. |
| RR | Receive ready |
| RNR | Receive not ready, used to indicate a busy condition |
| UI | Unnumbered information, used to convey capabilities response messages. |
| DISC | Discontinue, used to either terminate data mode or reject a request to switch to an unacceptable data mode. |
| UA | Unnumbered acknowledgment, used to acknowledge receipt of an acceptable switch to a requested data mode. |

The data link layer protocol supports two modes of operation: idle mode and active mode. In idle mode, no data communications path exists between the DCE and the far-end DCE. Active mode must be established by both DCEs in order to communicate data or capabilities information between them. During idle mode, the DCE need only interpret requests to establish a DCE-DCE data mode connection from the DCE hardware and the DTE. A request for the DCE to enter active mode may take one of the following four forms: (1) receipt of a data mode start sequence event from the DCE hardware; (2) receipt of a capabilities query indication from the DCE hardware; (3) receipt of a request to transmit data from the DTE; or (4) a request to transmit a capabilities query from the DTE.

When the DCE is operating in the facsimile data mode or modem data mode, the data link layer protocol does not provide any services except for assisting the DTE in switching between data and voice mode. In facsimile data and modem data modes, information is transported directly through the DCE between the DTE interface and the physical layer of the telephone network interface, unless an optional error-correcting protocol is utilized. The data mode will be terminated when the DCE either detects a loss of carrier or receives an end of transaction indication, such as the ATH command (see below) from the DTE. Both of these events cause the DCE to return to voice mode.

To accept and continue an incoming data transaction, the DCE sends an acknowledgment to the received data mode start sequence. For modem data mode and facsimile data mode, the acknowledgment takes the form of the mode signal followed by or included within an HDLC flag-bounded UA frame transmitted with V.21 (high channel) modulation response data block format. The modem data modulation handshake does not begin until this acknowledgment sequence is completed.

The DCE includes a user-configurable option that determines whether it sends any response to the originating DCE after detecting a data mode start sequence. This option may be set from the DTE via the −SSR parameter (discussed below). If the parameter is set to response enabled and the DCE detects a data mode start sequence corresponding to a mode that it currently supports (as defined by the information in its capability data structure), it responds to the originating DCE with an acknowledgment.

The acknowledgment takes the form of a V.21 mode signal followed by or included within either the UA, RR, or RNR frame. The answering DCE receives the first window of data immediately after the start data mode sequence. If at least the first frame of data in the window is received correctly, the answering DCE responds with an RR or RNR to acknowledge the last good frame received. If the data mode start sequence was received, but not even the first frame of data was correct, the answering DCE responds with a UA frame instead.

When the originating DCE sends any start data mode sequence, it starts a response timer. For example, the timer is started after the transmission of the mode tone is complete for fax and modem data modes and after the last data byte of the starting data block is sent in VoiceView data mode. If no acknowledgment is received before the timer expires, the originating DCE abandons the attempt to establish data mode and returns immediately to voice mode.

If an answering DCE detects a data mode start sequence that represents a mode that it currently does not support (as defined by the information in its capability data structure), it responds to the originating DCE with the V.21 mode signal followed by or included within an HDLC flag-bounded DISC frame transmitted with V.21 (high channel) modulation. The DCEs then immediately return to voice mode.

Figure 11:
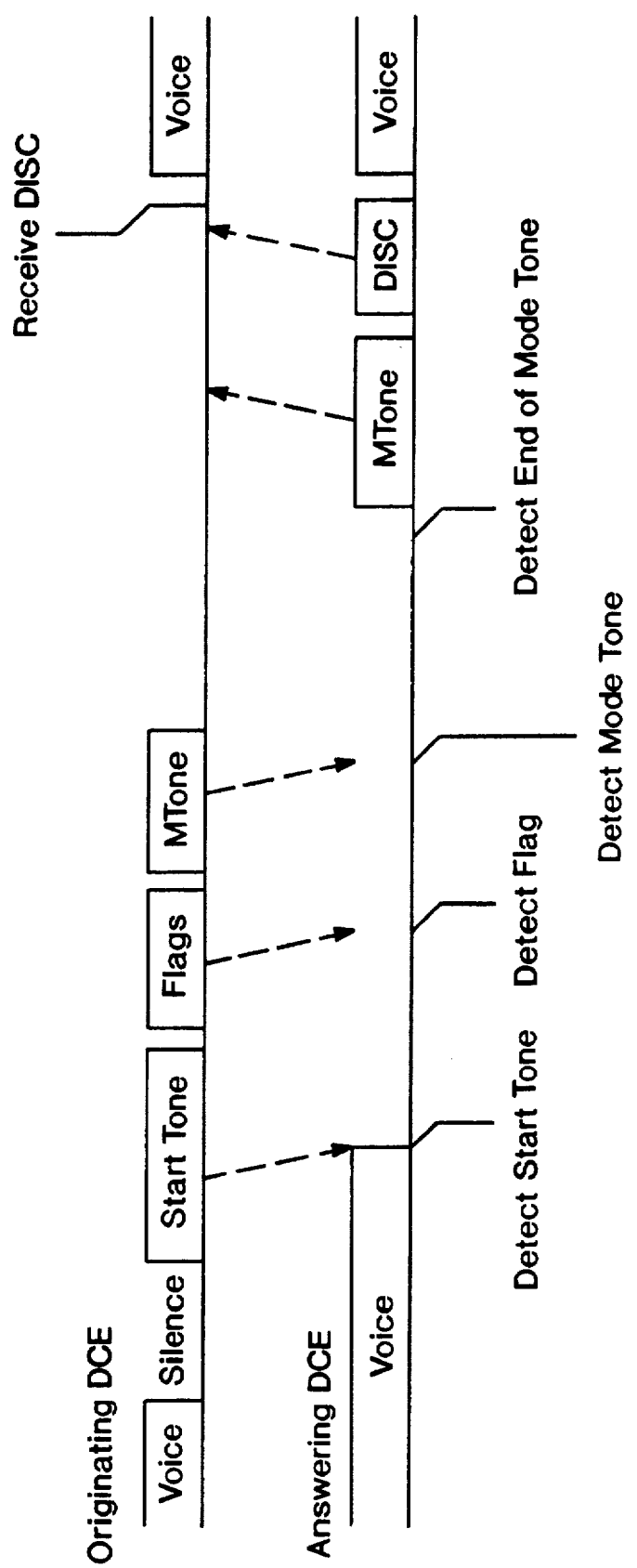
FIG. 11 is a diagram of an unsuccessful data mode start sequence for fax or modem data mode in which the start sequence is rejected by the answering DCE.

The DCE can determine when to reject a data mode request without any interaction with the DTE. However, the DTE is still notified by the DCE that the data mode start sequence was received. The DCE uses the information stored in its capabilities data structure to determine whether to accept or reject a switch to a data mode. The DTE is responsible for managing the capability data structure that contains the data transmission capabilities currently supported in the DCE. The DCE may also reject a switch to data mode request if it has no available data buffers or if the DTE is not active. When an originating DCE receives a DISC in response to its request to switch to that data mode, it immediately abandons the effort to switch to data mode, returns to voice mode, and notifies its DTE. The rejection scenario for responding to a modem or facsimile data mode start sequence is illustrated in FIG. 11.

The link layer terminates active mode and returns to idle mode operation upon any of the following events:

(a) receiving an indication to terminate the data transaction (e.g., end of transaction, data mode rejected, capabilities exchange complete) from its DTE;

(b) receiving an indication that data mode has been terminated (e.g., loss of carrier) from the DCE hardware while in modem data mode or fax data mode;

(c) encountering an unrecoverable data link error, such as no response from the far-end DCE, or receiving a DISC message from the far-end DCE while in VoiceView data mode.

When the DCE terminates active mode, it also informs the DCE hardware to return to voice mode.

Figure 12:
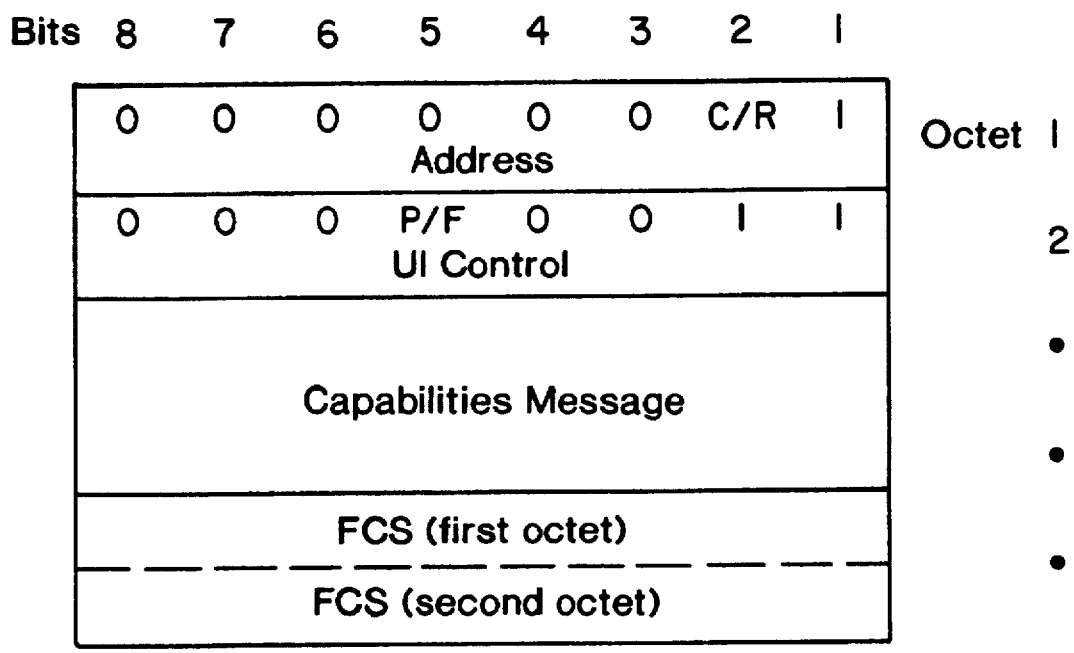
FIG. 12 is a diagram of message format used for communicating capabilities information between DCEs.

The data link layer protocol supports the notification and exchange of capabilities information using the HDLC unacknowledged information transfer mode. When the answering DCE receives an indication from its physical layer that a capabilities query has been received, it enters active mode and notifies the DTE of the event. The DTE assembles the DCE's capabilities information into a capabilities response message and notifies the DCE that it is ready for transmission to the far-end DCE. The capabilities information is transferred between DCEs using a flag-bounded UI (Unnumbered Information) frame at the burst data rate unless the transmission time is calculated to exceed one second. Otherwise, the information is sent using the recovery rate. The contents of the frame are shown in FIG. 12. The answering DCE may respond to a capabilities query with the UI frame with the poll bit (P) set to 0 and the C/R bit set to 0. In this case, the DCE returns to idle mode.

When a DCE that has originated a capabilities query receives the capabilities response UI frame with the P bit set to 1, it interprets it as a request to exchange capability information. Upon receiving the polling UI frame, the DCE reports both the data contents of the frame as well as an indication of the exchange request to its DTE. In response, the DTE assembles its capabilities information into a capabilities message and requests that it be transmitted to the far-end DCE. In a capabilities response, the F bit is set to 1 and the C/R bit is set to 1 in the UI frame. The DCE returns to idle mode and informs its physical layer to return to voice mode after transmitting the frame.

Data Link Layer Operation in Voiceview Data Mode

The VoiceView data mode utilizes a link layer protocol that provides synchronous transmission of data as specified in the HDLC procedures. Because the protocol is intended for use in the VoiceView half-duplex environment, only a subset of the standard HDLC procedures is used. In VoiceView data mode, information is transferred using the two-way alternating method. This means only one DCE can transmit data at a time. The transmitting DCE assumes the role of master of the data link. The other DCE must acknowledge the received data and wait until the sending DCE completes its data message before it is allowed to transmit data. The originating DCE always has the first ability to transmit data in a data transaction. During a two-party phone call, either DCE may begin a data transaction by assuming the role of an originating DCE.

When the DCE has data available to send, it segments the data into I frames containing up to no more than 256 bytes of data each. Up to 9 frames may be sent in a data block at a time. All of these frames must be acknowledged by the receiving DCE before new I frames can be sent. When the originating DCE sends the data mode start sequence to initiate VoiceView data mode, it does not wait for a response but sends the first data block immediately following the start sequence, as described above. The starting data block serves the dual purpose of initiating the switch to VoiceView data mode and transmitting over 2 K bytes of data in one efficient transmission burst. However, after the starting data block has been transmitted an acknowledgment is required. The starting data block format is sent only once at the beginning of a data transaction. The subsequent data block format is used to exchange all other data frames between the DCEs.

The VoiceView data mode uses an adaptive selection of data modulation schemes. The DCE first transmits a starting data block using the priority transmission rate to transport the data. If the starting data block is transmitted and no response is received from the answering DCE before the acknowledgment timer expires, the originating DCE aborts data mode, notifies its DTE with an ERROR result code, and immediately returns to voice mode. If an acknowledgment is received before the timer expires, indicating that only some of the data was received correctly, the DCE initiates retransmission of the data. However, this time the data is sent using the subsequent data block format. If a UA frame was received, the entire window of data frames is retransmitted using the priority transmission rate. If an RR has been received, only those unacknowledged frames are retransmitted at the priority data rate.

After the first retransmission, if no response is encountered before the time out or only some of the frames are successfully acknowledged, the DCE retransmits the remaining unacknowledged frames in a subsequent data block one last time using the recovery transmission rate (or burst rate if recovery rate was used the first two times). If the timer again expires, the DCE aborts data mode, immediately returns to voice mode, and notifies the DTE.

If the first data block is successfully delivered to the far-end DCE, the remainder of the data message is transmitted by the sending DCE using one or more subsequent data blocks. All the frames in a data block must be acknowledged before new frames are transmitted in a new block.

If a data block or portion thereof cannot be successfully transmitted at the priority transmission rate during a data mode transaction but is successfully retransmitted at the recovery transmission rate, the DCE automatically sends all remaining information data blocks during that data mode transaction using the recovery rate. This strategy minimizes transmission time of data on telephone connections with marginal transmission quality by avoiding subsequent transmissions at the priority rate that are likely to fail. This mode of operation is reset when returning to voice mode so that the next data mode transaction (i.e., a new data mode start sequence) will attempt transmission at the priority rate again.

If data frames (I frames) are transmitted in both directions during VoiceView data mode, them is no requirement that both directions must use the same transmission rates. The information may be transmitted in one direction at a different transmission rate from the other depending on line quality and DCE capabilities. The use of a mode tone to start the data block transmission allows the selection of varying data rates. In general, all I frames transmitted by a VoiceView DCE are transmitted as follows:

(a) The first transmission of either a starting or subsequent data block uses the priority transmission rate (default 9600 bps).

(b) The first retransmission of some or all unacknowledged frames in the data block is transmitted at the priority transmission rate.

(c) The second and final retransmission of unacknowledged frames in the data block use the recovery transmission rate (default 4800 bps).

Network Layer Protocol

The network layer protocol (layer 3) is required only for VoiceView data mode. These capabilities are necessary to manage the transmission of data messages across the half-duplex data link through the telephone network. The network layer protocol for VoiceView data mode provides:

(a) a means to indicate the end of a data message;

(b) an indicator that signifies that the sender wishes to complete the data transaction and that standard data link layer acknowledgments and link release procedures are expected;

(c) an indicator that signifies that the sender wishes to complete the data transaction and requests immediate return to voice mode without standard data link layer acknowledgments and link release procedures;

(d) an indicator that passes control of the link to the far-end station by allowing it to transmit a data message;

(e) an indicator that signifies that the current message is the last it has to send in this transaction; however, the receiving entity should provide a single data message response;

(f) an indicator that signifies that the current data message is incomplete and has been prematurely aborted by some user or DTE action.

A network layer (layer 3) data message sent from one VoiceView DCE to another via the telephone network is terminated by one of the following two-character sequences: <DLE><EOT>, <DLE><ESC>, <DLE><ETX>, <DLE><ETB>, or <DLE><CAN>. When one of these sequences is received from the far-end DCE, it is both processed by the receiving DCE as well as passed to its local DTE.

The <DLE><EOT> is used to perform a one-way simplex data transaction as well as to terminate a two-way alternating data transaction. One-way simplex operation supports data transfer only from the originating DCE to the answering DCE. Two-way alternating operation allows data messages to be transferred in both directions during a single data mode transaction. The <DLE><EOT> string indicates both the end of the message and the normal end of the transaction. The DCE receiving this string in an I frame performs standard data link functions to acknowledge outstanding I frames and remain in data mode. Once the DCE that sent the <DLE><EOT> receives the acknowledgment (P,R), it automatically transmits a DISC frame and then returns to voice mode. The DCE receiving the DISC immediately returns to voice mode upon processing the DISC frame.

The <DLE><ESC> is similar to the <DLE><EOT> except that it requests the receiving DCE to immediately return to voice mode after detecting the string. The receiver immediately returns its data link layer to the idle state and does not attempt to acknowledge any outstanding I frames. All correctly received data is transferred to the DTE. The DCE that sends the <DLE><ESC> places its data link layer in idle mode and returns to voice mode as soon as the string has been transmitted to the telephone network interface.

The <DLE><ETX> string is used to provide two-way alternating operation. The <DLE><ETX> indicates the end of the message as well as the sending DCE's consent to relinquish control of the data link. In two-way alternating mode, only the DCE with control of the link (master) may transmit a data message. In addition, the DCEs must alternate sending messages (i.e., a DCE cannot transmit two data messages in a row without receiving a message from the other DCE during a single data mode transaction). Once a DCE transmits the <DLE><ETX>, it waits for acknowledgment of the I flames and then starts a timer. If it does not receive a valid I frame from the far-end before the timer expires, the data link is released and the DCE returns to voice mode.

Once a receiving DCE detects the <DLE><ETX> string at the end of a message, it first acknowledges the data flames, and then may proceed to transmit a data message if it has one available. The data message transmitted by this DCE may be terminated with any of the message terminating strings above. To continue in two-way alternating mode, the message terminates with a <DLE><ETX>. This allows the other DCE to again control the data link. If no data is available to transmit when the DCE receives a <DLE><ETX> terminated message, the DCE starts a timer. If the timer expires before the DCE receives data from the DTE, it transmits nothing to the far-end DCE, returns to voice mode, and sends a <DLE><CAN> to the DTE.

The <DLE><ETB> is used to end the data mode transaction after a single data message response. The DCE transmitting this string indicates that it has no more data to send but expects a single data message response. Once a receiving DCE detects the <DLE><ETB> string at the end of a message, it first acknowledges the data frames, and then may proceed to transmit a data message if it has one available. The data message response ends with either a <DLE><EOT>, <DLE><ESC>, or <DLE><CAN> or will be considered an error. If this error is encountered by the DCE receiving the message, it sends a DISC frame to the DCE transmitting the message and returns to voice mode. If no message is available to transmit when the DCE receives a <DLE><ETB> terminated message, it starts a timer. If the timer expires before the DCE receives data from the DTE to transmit, it returns to voice mode and sends a <DLE><CAN> to the DTE.

The <DLE><CAN> string indicates both the end of the message and the abnormal end of the transaction. A DTE that is transmitting a data message will typically terminate a message with this string rather than the <DLE><EOT> if the message is incomplete because it has been terminated abruptly by a user action. The DCE receiving this string in an I frame functions as though it received the <DLE><EOT> string. It performs standard data link functions to acknowledge outstanding I frames and remains in data mode. Once the DCE that sent the <DLE><CAN> receives the acknowledgment (RR), it automatically transmits a DISC frame and then returns to voice mode. The DCE receiving the DISC immediately returns to voice mode upon processing the DISC frame.

Capability Information

Figure 13:
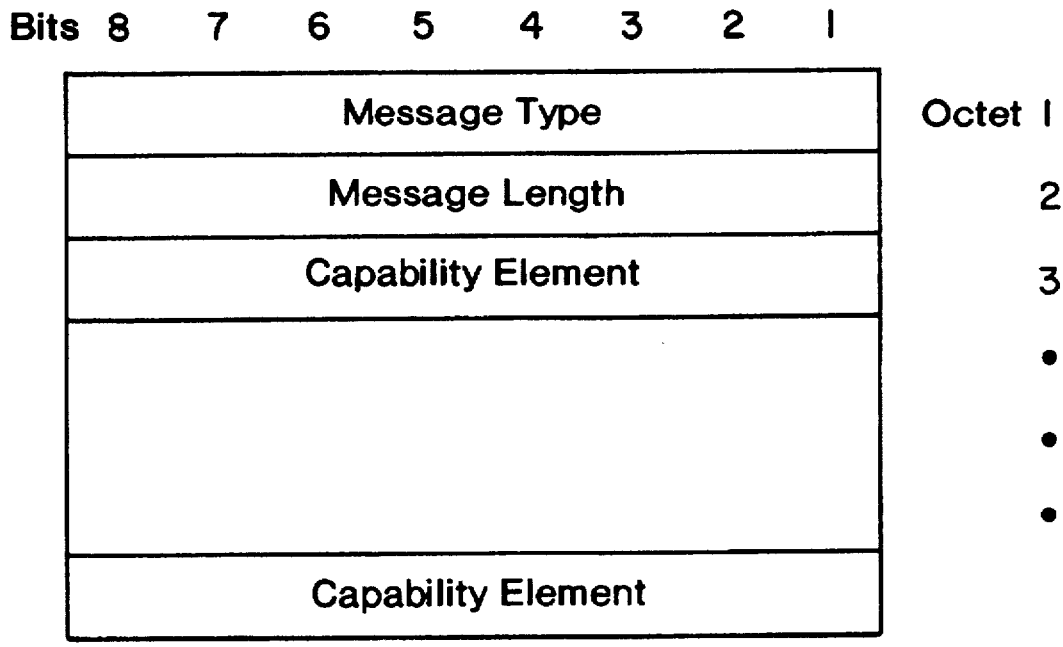
FIG. 13 is a diagram of the format of the capabilities query message I-field.

The DCE maintains a capabilities data structure detailing the inherent data communications capabilities that it supports. The DTE interface parameter-SCD enables the capabilities options of the data structure to be queried and changed by the DTE. The DCE will also transmit its capability information to the far-end DCE when responding to a capabilities query or a two-way capabilities exchange request (polling capabilities response) by means of the information field of a UI frame as shown in FIG. 13. When a DCE receives this information in response to a capabilities query, it is reported to the DTE.

The DCE may include as many capability elements as necessary in the capabilities response message in order to fully specify the DCE's capabilities. The DCE's processor builds the message based on the current information in the DCE's capabilities data structure. The data structure includes features inherently supported by the DCE (unless they have been disabled by the DTE) and capabilities explicitly written to the DCE's capabilities data structure by the DTE. Capabilities elements may be included in the message in any order. Capability elements may take any of the four forms shown in FIGS. 14a–14d.

The first octet of every capability element indicates the form of the element and specifies the capability type identifier. The two high order bits (7 and 8) of octet 1 comprise the form field. This field indicates the number of octets that follow the first octet in the capability element. A "00" indicates that there are no octets of information following, "01" indicates one octet, "10" indicates two octets, and "11" indicates a variable number (3 or more). When the coding "11" is used, the second octet specifies the length of the capability element in octets. This length field is coded using the same rules as the message length field described above (i.e. only octets following the length field are included in the length). The different capability element forms allow for future growth in the number of options that can be specified for any capability type specified in the identifier field.

Figure 14A:
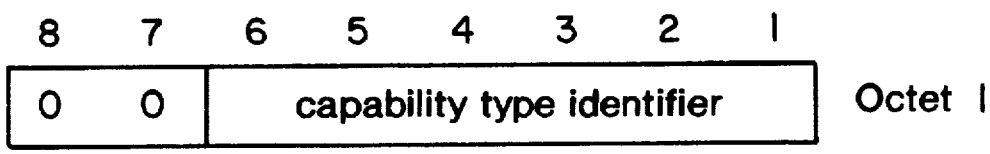
FIGS. 14a through 14d are diagrams of the formats of capability elements within a capabilities query message for: (a) single octet format; (b) double octet format; (c) triple octet format; and (d) variable length format for 3 or more octets, respectively.
Figure 14B:
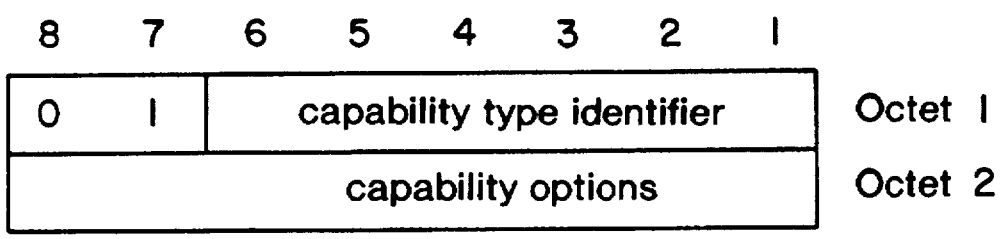
Figure 14C:
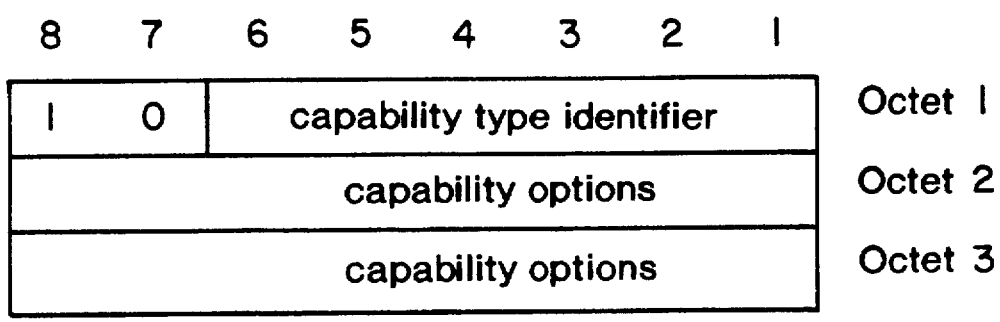
Figure 14D:
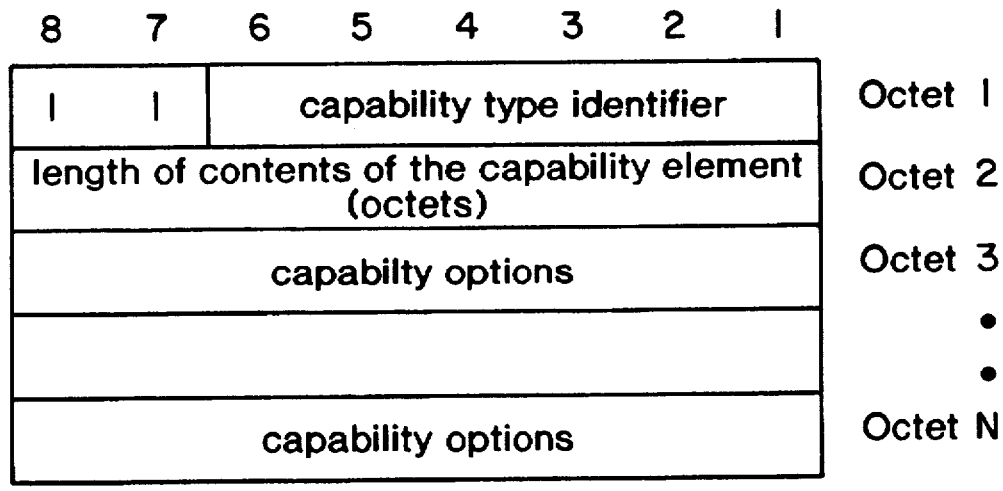

Whenever a capability element is coded using the single octet form as shown in FIG. 14a, it implies that the DCE supports only the default options associated with that capability. When a capability element is included using a form other than the single octet ("00") form, it is interpreted as indicating support of default as well as the optional capabilities that are indicated in the options octets. Bits 1 through 6 in octet 1 define the capability type identifier field. The coding of the field identifies the type of capability that is supported. The value specified for this field represents the same capability regardless of the form of the information element used. Therefore, support for a capability type can be specified using multiple forms depending on the number of capability options that are currently supported. The coding for standard capabilities types is shown in FIG. 15.

DATA TERMINAL EQUIPMENT (DTE)

The data terminal equipment or DTE typically consists of a computer processor 10 with an associated display 15, keyboard, and an optional mouse. For example, the DTE can be implemented with a conventional personal computer. The DTE communicates with the DCE via a serial asynchronous interface 13 compatible with TIA/EIA-232-E (including CCITT V.24) circuits. However, the DCE and DTE data exchange is not limited to a serial interface. The DTE-DCE interface may be implemented in any environment that provides a character serial bidirectional data stream, including but not limited to, processor bus attached boards, local area networks, Small Computer Systems Interface (SCSI), ANSI X3.131, IEEE 1284, etc. However, the DTE-DCE data interface should be capable of transmitting at least 9600 bps in a duplex mode.

Communication between the DCE and the DTE utilizes extensions to the AT commands specified in TINEIA-602 and TINEIA-615, in a manner similar to that used to communicate with conventional modems. A command line is a string of characters sent from the DTE to the DCE while the DCE is in command state. Command lines have a prefix, a body, and a terminator. The prefix consists of the ASCII characters "AT." The body is a string of commands and associated parameter values. The DCE maintains a parameter for control and identification of the active service mode. This parameter, +FCLASS, defines whether modem data services (+FCLASS=0), facsimile services (+FCLASS=1, 2, or 2.0), or VoiceView data services (+FCLASS=80) are active in the DCE. Additional values for the +FCLASS parameter can be assigned for other data modes. The following is a summary of the action commands that can be sent by the DTE to the DCE while in the VoiceView service class:

| Command | Name |
|---------|------|
| ATD | Dial Call |
| ATA | Answer Call |
| ATH | Hook Control |
| ATZ | Reset to Default Configuration |
| AT-SVV | Originate VoiceView Data Mode |
| AT-SAC | Accept Data Mode Request |
| AT-SIP | Initialize VoiceView Parameters |
| AT-SIC | Reset Capabilities Data to Default Setting |
| AT-SSQ | Initiate Capabilities Query |
| AT-SDA | Originate Modem Data Mode |
| AT-SFX | Originate FAX Data Mode |
| AT-SRM | Retrieve Message |

-continued

| Command | Name |
|---------|------|
| AT-SEM | Erase Message |
| AT-SMT | Mute Telephone |

In response to these commands, the DCE may transmit result codes, such as OK, CONNECT, RING, NO CARRIER, and ERROR, back to the DTE. The DCE may also transmit unsolicited event messages to the DTE in response to communications from the far-end DCE:

| Event Message | Name |
|---------------|------|
| -SSV | VoiceView Data Mode Start Sequence Event |
| -SFA | Facsimile Data Mode Start Sequence Event |
| -SMD | Modem Data Mode Start Sequence Event |
| -SRA | Receive ADSI Response Event |
| -SRQ | Receive Capabilities Query Event |
| -SRC: | Receive Capabilities Information Event |
| -STO | Talk-off Event |
| -SVM | VoiceView Message Available |

Finally, special character commands and responses can be transmitted between the DCE and DTE, as follows:

| Character | Direction | Description |
|-----------|-----------|-------------|
| <DLE><CAN> | DTE -> DCE<br>DCE -> DTE | Abort data transfer in progress. Data transaction aborted. DCE requests DTE to stop sending data. Error condition exists. If followed by OK, transaction was aborted by far-end. If followed by ERROR, near-end DCE aborted transaction |
| <XOFF> | either | Indicates not ready to receive data |
| <XON> | either | Indicates ready to receive data |
| <DLE><ETX> | either | End of message marker, continue transaction, response requested |
| <DLE><ETB> | either | End of message marker, final response requested after which the transaction will terminate |
| <DLE><EOT> | either | End of message marker, final message of transaction, no response accepted |
| <DLE><ESC> | either | End of message marker, DCE immediately returns to voice mode |

This section is intended to illustrate what transpires between the DTE and the DCE during different types of data transactions. During a data transaction, either DCE endpoint may transmit data as long as it is master of the link based on the two-way alternating protocol. However, for brevity, DTE-DCE communications associated with transmitting data to the far-end DCE are described in the "Originating a VoiceView Transaction" section and DTE-DCE communications associated with receiving messages from the far-end DCE are described in the "Receiving a VoiceView Transaction" section.

Originating a VoiceView Data Transaction

This section describes the information exchanged between the DTE and the DCE when originating a Voice- View data transaction and when transmitting VoiceView data messages. First, the DTE prepares the DCE for a VoiceView data transaction by putting the DCE in VoiceView service class (+FCLASS=80). The DTE starts the transaction by issuing the AT-SW originate VoiceView data mode command. Unless an error condition exists, the DCE issues a CONNECT response meaning that the DCE is ready to receive data from the DTE. The DTE begins to download the data as soon as the CONNECT response is received. The DTE indicates that it has successfully finished transmitting the data in the current message by sending either a <DLE><EOT>, <DLE><ESC>, <DLE><ETX>, or <DLE><ETB> at the end of the message.

The DTE may terminate a data message by sending the <DLE><EOT> termination sequence to the local DCE. This sequence is used to mark the end of the data message and terminate the data transaction. When the local DCE receives the <DLE><EOT> sequence from the DTE, it interprets it as the End of Message (EOM) marker. The DCE transmits any data already buffered followed by the termination sequence to the far-end DCE. After the local DCE transmits the message and its data link layer has received an acknowledgment from the far-end DCE, both DCEs return to voice mode. The DCE issues the OK result code to the DTE once this has been successfully accomplished. The DCE issues the ERROR response if a failure occurred while transmitting the data to the far-end DCE.

Second, the DTE may terminate the data message by using the <DLE><ESC> termination sequence. The DTE uses this sequence when it wishes to send a data message and then immediately return to voice mode. The DCE interprets this sequence as the EOM marker as well as the end of the transaction. The DCE transmits any data already buffered followed by the termination sequence to the far-end DCE. When the last data block (window) of data frames is transmitted, the DCE does not wait for an acknowledgment but immediately returns to voice mode and issues the OK response to the DTE if the message was transmitted successfully. The DCE issues the ERROR response if a failure occurred while attempting to transmit the data to the far-end DCE.

Third, the DTE may terminate the data message by using the <DLE><ETX> termination sequence to invoke the two-way alternating message transfer mode. The DTE uses this sequence when it wishes to end the message but continue to allow data messages to be communicated in both directions between the DCEs. The DTE expects to receive a data message in response to sending the <DLE><ETX>. It will not transmit another data message until it receives a response terminated with either a <DLE><ETX> or <DLE><ETB>. The DCE interprets the <DLE><ETX> sequence as the EOM marker. The DCE transmits any data already buffered followed by the termination sequence to the far-end DCE and prepares to receive a data message response after acknowledgments. In this case, the DCE treats any data message response that terminates in <DLE><ETX> or <DLE><ETB> to be an error.

Fourth, the DTE may terminate the data message by using the <DLE><ETB> termination sequence. The DTE uses this message to indicate that it has finished sending messages for this data transaction but that it expects a single data message response from the far-end. The DCE interprets the <DLE><ETB> sequence as the EOM marker. The DCE transmits any data already buffered followed by the termination sequence to the far-end DCE and then prepares to receive a data message response.

Alternatively, the DTE may terminate the data transmission in an abrupt fashion by using the <DLE><CAN> cancel sequence. When the DTE is transmitting data to the DCE, it always sends either the <DLE><EOT>, <DLE><ESC>, or <DLE><CAN> sequence to terminate the data transaction. The DCE must accept the <DLE><CAN> cancel sequence from the DTE even while the DTE is flow controlled off, allowing the originating DTE to cancel out of a stalled data transmission. The DCE interprets this sequence as an immediate abort command. The DCE transmits any data already buffered followed by the termination sequence to the far-end DCE. The DCE issues the OK response once the data has successfully transmitted to the far-end DCE. The DCE issues an ERROR response if there was a failure in transmitting the data to the far-end DCE.

Receiving a VoiceView Data Transaction

This section describes the information exchanged between the DCE and the DTE when receiving VoiceView data messages. The DTE prepares the DCE to respond to VoiceView data mode start sequences by first setting +FCLASS=80. This parameter conditions the DCE to detect data mode start sequences and to notify the DTE when the VoiceView data mode start sequence is received. If the DCE receives a valid VoiceView data mode start sequence, the DCE starts a timer. The DTE responds with an AT-SAC accept data mode request command to continue the transaction. The AT-SAC command must be received by the DCE before the time expires. If the time expires, the DCE sends no response to the far-end DCE, flushes its buffers of any received data, and returns to voice mode after the received data carrier is lost.

The DCE to DTE data transmission may be terminated in three ways. First, the DCE may send the DTE the <DLE><EOT> or <DLE><ESC> sequence received from the far-end DCE followed by the OK message after the DCE has returned to voice mode. The DTE interprets either sequence as the end of the received message and end of data transaction. Second, the DCE may send the DTE a <DLE><CAN> cancel sequence followed by the OK message. This occurs if the DCE received a data message from the far-end DCE correctly, but the originating DTE had aborted the message early. The <DLE><CAN> cancel sequence was received as the message terminator in the data received from the far-end DCE. Third, the DCE may send a <DLE><CAN> cancel sequence followed by the ERROR message. The DCE issues the ERROR response if there was a failure in receiving or sending the data from/to the far-end DCE, such as not receiving any data within the time-out period. If the error occurred during receipt of a message from the far-end DCE, the DCE appends the <DLE><CAN> cancel sequence to the data being sent to the DTE.

The DTE can send the <DLE><CAN> cancel sequence to abort the data reception process. When the DCE receives this character sequence, it transmits the DISC link layer frame to the far-end DCE at its next opportunity, instead of an acknowledgment. This will terminate the data transmission. The DCE deletes all received data in its buffers and sends <DLE><EOT> to the far-end DCE. Once the DCE has completed the abort process it issues the OK message to the DTE.

Setting and Reading Capabilities Data

This section describes the information exchanged between the DTE and the DCE when setting and reading the capabilities data in the DCE's capabilities data structure. The DTE can set the data structure to the inherent capabilities of the DCE by issuing either the AT-SIP initialize parameters command or the AT-SIC initialize capabilities command. The DTE may read the capabilities data in the local DCE by issuing AT-SCD?. The DCE responds with its capabilities. The DTE can choose which DCE capabilities to enable (i.e., those which it has in common with the far-end DCE). The DTE can change capabilities already present in the capabilities data by nullifying the capabilities data structure and then writing the desired capabilities data to the DCE. The DTE nullifies the capabilities data by writing the <NULL> character to the −SCD: parameter. The DTE then writes the new capabilities data by issuing the AT-SCD: <capabilities> command.

Orginating a Capabilities Query

This section describes the information exchanged between the DTE and the DCE when originating a capabilities query. The DTE initiates the capabilities query by first putting the DCE in VoiceView service class (+FCLASS=80). The DTE starts the transmission of the capabilities query with the AT-SSQ start query command. The DCE may issue five possible responses: −SRQ, −SRA, −SRC:<capabilities>, ERROR, OK, and combinations of some of these responses. The DCE issues the −SRA message if the responding endpoint indicates that it supports ADSI capabilities only. The −SRA message is immediately followed by the OK response message. The DCE returns the −SRC:<capabilities> message to the DTE if the answering DCE responds with VoiceView capabilities. The DCE will also issue an −SRQ message following the −SRC: <capabilities> message if the query response from the far-end DCE requests a two-way exchange of the DCE's capabilities (polling was set). In this case, the OK response is issued after the local DCE's capabilities are transmitted and the DCE returns to voice mode. If the far-end DCE does not request a two-way exchange of capabilities (polling not set), then the −SRQ message will not be issued and the OK response is issued as the final result code when the DTE returns to voice mode.

Receiving a Capabilities Query

This section describes the information exchanged between the DTE and the DCE when the DCE responds to a VoiceView capabilities query. The DCE issues the SRQ message to the DTE whenever a capabilities query is detected. If the −SQR query response parameter is set to respond to the query by simply sending a capability response message (one-way exchange) to the originating DCE, then no other messages are issued to the DTE as a result of the query and the DCE is ready to accept the next command. If the −SQR query response parameter is set to request a two-way exchange of capability information with the originating DCE, then the −SRQ message is followed by the −SCD:<capabilities> message when the capabilities data is received.

Originating Modem and Fax Transactions

This section describes the information exchanged between the DTE and the DCE when originating a facsimile data mode transaction or a modem data mode transaction. This section discusses these two types of transmissions together because they are very similar, not because they are coupled. One mode may be implemented without implementing the other.

The DTE initiates the data transaction by first putting the DCE in VoiceView service class (+FCLASS=80). The DTE then initiates the data mode start sequence by issuing an AT-SDA command to originate modem data mode or an AT-SFX command to originate facsimile data mode. The DCE transmits the start sequence and waits to receive an acknowledgment from the far-end DCE before issuing the OK response. Once the OK response code is received by the DTE, it switches the DCE to the service class appropriate for the data mode. For modem data mode the DTE sets the +FCLASS parameter to 0; for facsimile data mode the parameter is set to 1, 2, or 2.0. Once the service class is switched, the DCE operates in the manner appropriate for the current service class. To establish the modem data session, the DTE initiates the data handshaking sequence in the DCE by sending it an ATD dial command. During the data session establishment process, the DCE does not issue call progress messages (e.g., BUSY, NO DIALTONE) since the call is already connected. As per TINEIA-602, the data session is established in the manner specified by existing standards when the DTE receives the CONNECT message. The modem data mode (+FCLASS=0) uses the data modem protocol established by the DTE. Typically, commands, such as ATN and ATB, and parameters, such as the S37 register, are used to establish the protocol mode. The facsimile data mode (+FCLASS=1, 2, or 2.0) uses the T.30 protocol once the data connection is established.

When the DTE wishes to terminate the data session, it issues a termination command (ATH0 or ATZ) to instruct the DCE to terminate the data transaction and return to voice mode. The DCE returns to voice mode after processing such a command and sets the service class to the default service class. The data session will also be terminated if the DCE receives a loss of modem data carrier or facsimile data carrier. in this case, the DCE returns to voice mode, switches to the default service class, and reports a NO CARRIER result code to the DTE. If the DTE wishes to continue to use the VoiceView switched voice/data capabilities of the DCE, it issues an +FCLASS=80 message to return the DCE to VoiceView service class (unless +FCLASS=80 is the default). This is necessary because the DCE will only detect start data mode sequences and initiate a switch to data mode on an active call while active in service class 80.

Receiving Modem and Fax Data Transactions

This section describes the information exchanged between the DCE and the DTE when the DCE detects a modem data mode start sequence or a facsimile data mode start sequence. The DTE prepares the DCE to detect modem data mode start sequences or facsimile data mode start sequences by setting the +FCLASS parameter to service class 80. If the DCE determines that the data mode start sequence matches the information in its capabilities data structure, it sends an acknowledgment (UA) to the originating DCE first and then reports the event to the DTE. If the data mode start sequence does not match the DCE's current capabilities, the DCE sends a reject (DISC) to the originating DCE and then reports the event to the DTE. The DCE reports the receipt of a modem data mode start sequence with a −SMD message and a facsimile data mode start sequence with a −SFA message.

If the DTE wishes to accept the incoming start sequence, it responds to the −SMD or −SFA message by executing a switch to the appropriate service class. If −SMD message is received, the DTE sends AT+FCLASS=0 to the DCE. If the −SFA message is received, the DCE is set to +FCLASS=1, 2, or 2.0. The DTE immediately follows the switch with an ATA answer command. Once the DCE switches service class it functions as per the requirements for that class and starts the handshaking sequence for the appropriate data mode. The DTE receives a CONNECT response when handshaking has been successfully completed and the DCE is ready to send and receive data. The modem data mode (+FCLASS=0) uses the data modem protocol established by the DTE. Typically, the ATN and ATB commands along with register S37 are used to establish the protocol mode. The facsimile data mode (+FCLASS=1, 2, or 2.0) uses the T.30 protocol once the data connection is established.

When the DTE wishes to terminate the data session, it issues a termination command (ATH0 or ATZ) to instruct the DCE to terminate the data transaction and return to voice mode. The DCE returns to voice mode after processing such a command and switches the service class to the default. The data session will also be terminated if the DCE receives a loss of modem data carrier or facsimile data carrier. In this case, the DCE returns to voice mode, switches to the default service class, and reports a NO CARRIER result cede to the DTE. If the DTE wishes to continue to use the VoiceView switched voice/data capabilities of the DCE once a modem data mode or fax data mode transaction has ended, it issues an +FCLASS=80 message to return the DCE to VoiceView service class (unless +FCLASS=80 is the default), so that the DCE will detect start data mode sequences.

The foregoing discussion has presented a high-level description to show the inventive concepts of this telecommunications system in a concise and understandable manner, as well as to enable persons skilled in this art to practice the invention. There are, of course, many more details involved in implementing the invention that are common and known to persons skilled in the art, such as implementing the HDLC protocol and the details of presenting a suitable user interface for the modem, the application layer, data compression algorithms, and the like.

The above disclosure sets forth a number of embodiments of the present invention. Other arrangements or embodiments, not precisely set forth, could be practiced under the teachings of the present invention and as set forth in the following claims.

We claim:

1. A telecommunication system for providing voice and data communications between at least two stations over a telephone line that can be dynamically switched between a voice mode and any of a plurality of data modes, each of said stations comprising:

a telephone for voice communications;

switching means for selectively connecting said telephone to said telephone line in said voice mode and disconnecting said telephone from said telephone line in said data modes;

a modem for selectively providing data communications over said telephone line in any of a plurality of data modes;

means for transmitting a start signal over said telephone line to request that remote stations switch to one of said data modes prior to transmission of data by said modem, said start signal including a mode signal indicating one of said data modes;

means for detecting a start signal, including said mode signal, transmitted over said telephone line by a remote station; and a controller for monitoring said start signal detector and controlling said switching means and said modem to automatically switch from voice mode to a selected data mode when data is being received or transmitted.

2. The telecommunication system of claim 1, wherein said means for transmitting said start signal comprise a plurality of tone generators having preselected frequencies.

3. The telecommunication system of claim 1, wherein said means for detecting said start signal comprise a plurality of tone detectors for detecting tones at preselected frequencies.

4. The telecommunication system of claim 1, wherein said modem is capable of communicating data at any of a plurality of preselected data transmission rates and wherein said start signal comprises a signal indicating one of said data transmission rates.

5. The telecommunication system of claim 1, wherein said start signal comprises at least one tone having preselected frequencies followed by a sequence of HDLC flags.

6. The telecommunication system of claim 1, wherein said mode signal comprises at least one tone having preselected frequencies.

7. The telecommunication system of claim 1, wherein said mode signal comprises data modulated using the CCITT V.21 protocol indicating one of said data modes.

8. The telecommunications system of claim 1, wherein one of said data modes is the VoiceView protocol.

9. The telecommunication system of claim 1, wherein one of said data modes is a facsimile data mode consistent with the CCITT T.30 protocol.

10. The telecommunication system of claim 1, wherein one of said data modes is a modem data mode consistent with the CCITT V.22bis protocol.

11. The telecommunication system of claim 1, wherein each station further comprises means for exchanging information on the data modes supported by each station.

12. The telecommunication system of claim 11, wherein a first station transmits a query over said telephone line to a second station, and said second station responds to said query by transmitting information indicating the data modes that it supports.

13. A telecommunication system for providing voice and data communications between at least two stations over a telephone line that can be dynamically switched between a voice mode and any of a plurality of data modes, each of said stations comprising:

a telephone for voice communications;

a modem for selectively providing data communications over said telephone line in any of a plurality of data modes, said modem having a receive port coupled to said telephone line and a transmit port;

switching means for selectively connecting said telephone to said telephone line in said voice mode and disconnecting said telephone from said telephone line in said data modes, and for selectively connecting said transmit port of said modem to said telephone line in said data modes and disconnecting said transmit port of said modem from said telephone line in said voice mode;

means for transmitting a start signal over said telephone line to request that remote stations switch to one of said data modes prior to transmission of data by said modem, said start signal including:

(a) at least one start tone having preselected frequencies; and (b) a mode signal indicating one of said data modes;

means for detecting a start signal, including said start tone and said mode signal, transmitted over said telephone line by a remote station; and a controller for monitoring said start signal detector and controlling said switching means and said modem to automatically switch from voice mode to a selected data mode when data is being received or transmitted;

a processor for providing data to be transmitted by said modem to remote stations and for receiving data from remote stations via said modem; and a display for displaying data from said processor.

14. The telecommunication system of claim 13, wherein said start signal comprises the following sequence:

a period of silence;

a stad tone having a preselected frequency;

a plurality of HDLC flags; and a mode signal indicating one of said data modes.

15. The telecommunication system of claim 13, wherein said mode signal comprises at least one tone having preselected frequencies.

16. The telecommunication system of claim 13, wherein said mode signal comprises data modulated using the CCITT V.21 protocol indicating one of said data modes.

17. The telecommunication system of claim 13, wherein said modem is capable of communicating data at any of a plurality of preselected data transmission rates and wherein said start signal comprises a signal indicating one of said data transmission rates.

18. The telecommunication system of claim 13, wherein each station further comprises means for exchanging information on the data modes supported by each station.

19. The telecommunication system of claim 18, wherein a first station transmits a query over said telephone line to a second station, and said second station responds to said query by transmitting information indicating the data modes that it supports.

20. A telecommunication system for providing voice and data communications between at least two stations over a telephone line that can be dynamically switched between a voice mode and any of a plurality of data modes, each of said stations comprising:

data circuit-terminating equipment (DCE) having:

(a) a telephone for voice communications;

(b) a modem for selectively providing data communications over said telephone line in any of a plurality of data modes, said modem having a receive port coupled to said telephone line and a transmit port;

(c) switching means for selectively connecting said telephone to said telephone line in said voice mode and disconnecting said telephone from said telephone line in said data modes, and for selectively connecting said transmit port of said modem to said telephone line in said data modes and disconnecting said transmit port of said modem from said telephone line in said voice mode;

(d) means for transmitting a start signal over said telephone line to request that remote stations switch to one of said data modes prior to transmission of data by said modem, said start signal including:

(1) at least one start tone having preselected frequencies; and (2) a mode signal indicating one of said data modes;

(e) means for detecting a start signal, including said start tone and said mode signal, transmitted over said telephone line by a remote station; and (f) a DCE controller for monitoring said start signal detector means and controlling said switching means and said modem to automatically switch from voice mode to a selected data mode when data is being received or transmitted; and data terminal equipment (DTE) controlling operation of said DCE having:

(a) a processor for and controlling said DCE controller, for providing data to be transmitted by said modem to remote stations and for receiving data from remote stations via said modem; and (b) a display for displaying data from said processor.

21. The telecommunication system of claim 20, wherein said start signal comprises the following sequence:

a period of silence;

a start tone having a preselected frequency;

a plurality of HDLC flags; and a mode signal indicating one of said data modes.

22. The telecommunication system of claim 20, wherein said mode signal comprises at least one tone having preselected frequencies.

23. The telecommunication system of claim 20, wherein said mode signal comprises data modulated using the CCITT V.21 protocol indicating one of said data modes.

24. The telecommunication system of claim 20, wherein said modem is capable of communicating data at any of a plurality of preselected data transmission rates and wherein said start signal comprises a signal indicating one of said data transmission rates.

25. The telecommunication system of claim 20, wherein each station further comprises means for exchanging information on the data modes supported by each station.

26. The telecommunication system of claim 25, wherein a first station transmits a query over said telephone line to a second station, and said second station responds to said query by transmitting information indicating the data modes that it supports.

* * * * *